United States Patent
Ye et al.

(10) Patent No.: US 12,395,300 B2
(45) Date of Patent: Aug. 19, 2025

(54) INFORMATION ENHANCEMENT METHOD AND APPARATUS, DEVICE, AND STORAGE MEDIUM

(71) Applicant: ZTE CORPORATION, Shenzhen (CN)

(72) Inventors: Xinquan Ye, Shenzhen (CN); Chuangxin Jiang, Shenzhen (CN); Zhaohua Lu, Shenzhen (CN); Yu Ngok Li, Shenzhen (CN); Hao Wu, Shenzhen (CN); Huahua Xiao, Shenzhen (CN); Yijian Chen, Shenzhen (CN); Shujuan Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 763 days.

(21) Appl. No.: 17/640,025

(22) PCT Filed: Aug. 21, 2020

(86) PCT No.: PCT/CN2020/110497
§ 371 (c)(1),
(2) Date: Mar. 3, 2022

(87) PCT Pub. No.: WO2021/043010
PCT Pub. Date: Mar. 11, 2021

(65) Prior Publication Data
US 2022/0329386 A1  Oct. 13, 2022

(30) Foreign Application Priority Data
Sep. 3, 2019  (CN) .......................... 201910829052.2

(51) Int. Cl.
*H04L 5/00* (2006.01)
*H04L 1/00* (2006.01)
*H04W 72/1273* (2023.01)

(52) U.S. Cl.
CPC ....... *H04L 5/0053* (2013.01); *H04W 72/1273* (2013.01)

(58) Field of Classification Search
CPC .... H04L 5/0053; H04L 1/08; H04W 72/1273; H04W 72/20; H04W 72/232
See application file for complete search history.

(56) References Cited

U.S. PATENT DOCUMENTS

| 2018/0279269 A1 | 9/2018 | Fröberg Olsson et al. |
| 2019/0020506 A1 | 1/2019 | Cheng et al. |

(Continued)

FOREIGN PATENT DOCUMENTS

| CN | 105210434 A | 12/2015 |
| CN | 106165508 A | 11/2016 |

(Continued)

OTHER PUBLICATIONS

ZTE "Enhancements on Multi-TRP and Multi-Panel Transmission" 3GPP TSG RAN WG1 #98 R1-1908191, Aug. 17, 2019.

(Continued)

*Primary Examiner* — Kent Krueger
(74) *Attorney, Agent, or Firm* — BOND, SCHOENECK & KING, PLLC; George R. McGuire

(57) ABSTRACT

Provided are an information enhancement method and apparatus, a device and a storage medium. The information enhancement method includes determining a first DCI subset in a downlink control information (DCI) set and a second DCI subset in the DCI set, where the first DCI subset includes N pieces of repetitive DCI, and the second DCI subset includes M-N pieces of nonrepetitive DCI, where N is an integer greater than 1, and M is an integer greater than N; and determining correlated information about DCI in the DCI set according to the N pieces of repetitive DCI.

13 Claims, 12 Drawing Sheets

(56) References Cited

U.S. PATENT DOCUMENTS

2020/0196343 A1* 6/2020 Marinier ............... H04L 5/0087
2022/0256566 A1* 8/2022 Gao .................. H04W 72/1263

FOREIGN PATENT DOCUMENTS

| | | | |
|---|---|---|---|
| CN | 106454694 | A | 2/2017 |
| CN | 109769303 | A | 5/2019 |
| CN | 110061816 | A | 7/2019 |
| CN | 110535614 | A | 12/2019 |
| CN | 110536451 | A | 12/2019 |
| WO | 2015072687 | A2 | 5/2015 |
| WO | 2019029523 | A1 | 2/2019 |

OTHER PUBLICATIONS

Translated International Search Report and Written Opinion for PCT/CN2020/110497, filed Aug. 21, 2020. Mailing date of search report, Nov. 6, 2020.

Extended European Search Report, Application No. 20859781.5 - 1206, dated Aug. 22, 2023, pp. 1-30.

LG Electronics , "Discussion on PDCCH repetition for URLLC", 3GPP Draft; R1-1802227, 3rd Generation Partnership Project (3GPP); vol. Ran WGa, no. Athens, GR; Feb. 26, 2018-Mar. 2, 2018; Feb. 16, 2018; XP051397232, Internet URL: http://www.3gpp.org/ftp/tsg%5Fran/WG1%5FRL1/TSGR1%5F92/Docs/ [retrieved on Feb. 16, 2018], pp. 1-4.

Translated CN First Search Report, Application No. 2019108290522, Dated Sep. 3, 2019, Entire document.

Translated CN Office Action, Application No. 201910829052.2, Dated Nov. 20, 2024, Entire document.

* cited by examiner

INFORMATION ENHANCEMENT METHOD AND APPARATUS, DEVICE, AND STORAGE MEDIUM

CROSS-REFERENCE TO RELATED APPLICATIONS

This is a National Stage Application filed under 35 U.S.C. 371 based on International Patent Application No. PCT/CN2020/110497, filed on Aug. 21, 2020, which claims priority to Chinese Patent Application No. 201910829052.2 filed on Sep. 3, 2019, the disclosures of both of which are incorporated herein by reference in their entireties.

TECHNICAL FIELD

The present application relates to wireless communication networks, for example, an information enhancement method and apparatus, a device and a storage medium.

BACKGROUND

Effectiveness and reliability are two important indicators to measure the quality of wireless communication. To improve transmission effectiveness, the New Radio (NR) access technology supports multiple transmission and reception points (multi-TRP) and multi-panel transmission. Repetitive transmission is a common method to improve communication reliability. In multi-TRP/panel scenarios, physical downlink shared channel (PDSCH) repetitive transmission is supported, but physical downlink control channel (PDCCH) repetitive transmission is not supported. Therefore, the reliability of the PDCCH repetitive transmission needs to be improved in the multi-TRP/panel scenarios.

SUMMARY

The present application provides an information enhancement method and apparatus, a device and a storage medium to improve the reliability of the PDCCH repetitive transmission in the multi-TRP/panel scenarios.

Embodiments of the present application provide an information enhancement method. The method includes the following.

A first downlink control information (DCI) subset in a DCI set and a second DCI subset in the DCI set are determined, where the first DCI subset includes N pieces of repetitive DCI, the second DCI subset includes M-N pieces of nonrepetitive DCI, N is an integer greater than 1, and M is an integer greater than N.

Correlated information about DCI in the DCI set is determined according to the repetitive DCI.

Embodiments of the present application further provide an information enhancement method. The method includes the following.

Correlation of the N pieces of repetitive DCI, first resource information of the N pieces of repetitive DCI and second resource information of the N pieces of repetitive DCI are configured.

The correlation, the first resource information and the second resource information are sent to a user equipment (UE).

Embodiments of the present application further provide an information enhancement apparatus. The apparatus includes a repetitive DCI determination module and a correlated information determination module.

The repetitive DCI determination module is configured to determine a first DCI subset in a downlink control information (DCI) set and a second DCI subset in the DCI set, where the first DCI subset includes N pieces of repetitive DCI, the second DCI subset includes M-N pieces of nonrepetitive DCI, N is an integer greater than 1, and M is an integer greater than N.

The correlated information determination module is configured to determine correlated information about DCI in the DCI set according to the repetitive DCI.

Embodiments of the present application further provide an information enhancement apparatus. The apparatus includes a configuration module and a sending module.

The configuration module is configured to configure the correlation of the N pieces of repetitive DCI, the first resource information of the N pieces of repetitive DCI and the second resource information of the N pieces of repetitive DCI.

The sending module is configured to send the correlation, the first resource information and the second resource information to a UE.

Embodiments of the present application further provide a user equipment. The user equipment includes one or more processors and a memory. The memory is configured to store one or more programs. When executed by the one or more processors, the one or more programs cause the one or more processors to implement the preceding information enhancement method.

Embodiments of the present application further provide a base station. The base station includes one or more processors and a memory. The memory is configured to store one or more programs. When executed by the one or more processors, the one or more programs cause the one or more processors to implement the preceding information enhancement method.

Embodiments of the present application further provide a storage medium storing a computer program. When executed by a processor, the computer program causes the processor to perform any method in the embodiments of the present application.

DETAILED DESCRIPTION

Embodiments of the present application are described hereinafter in conjunction with drawings.

The steps illustrated in the flowcharts among the drawings may be performed by, for example, a computer system capable of executing a set of computer-executable instructions. Moreover, though logical sequences are illustrated in the flowcharts, in some cases, the illustrated or described steps may be performed in sequences different from the sequences described herein.

To describe the content of the present application, the nouns and the working processes involved in the embodiments of the present application are first explained below.

The technical solutions of the present application is applicable to various communications systems, for example, Global System for Mobile Communications (GSM) systems, code-division multiple access (CDMA) systems, wideband code-division multiple access (WCDMA) systems, General Packet Radio Service (GPRS) systems, Long-Term Evolution (LTE) systems, LTE Advanced (LTE-A) systems, Universal Mobile Telecommunications Systems (UMTSs) and the 5th-generation mobile communication (5G) systems. This is not limited in the embodiments of the present application.

Figure 2:
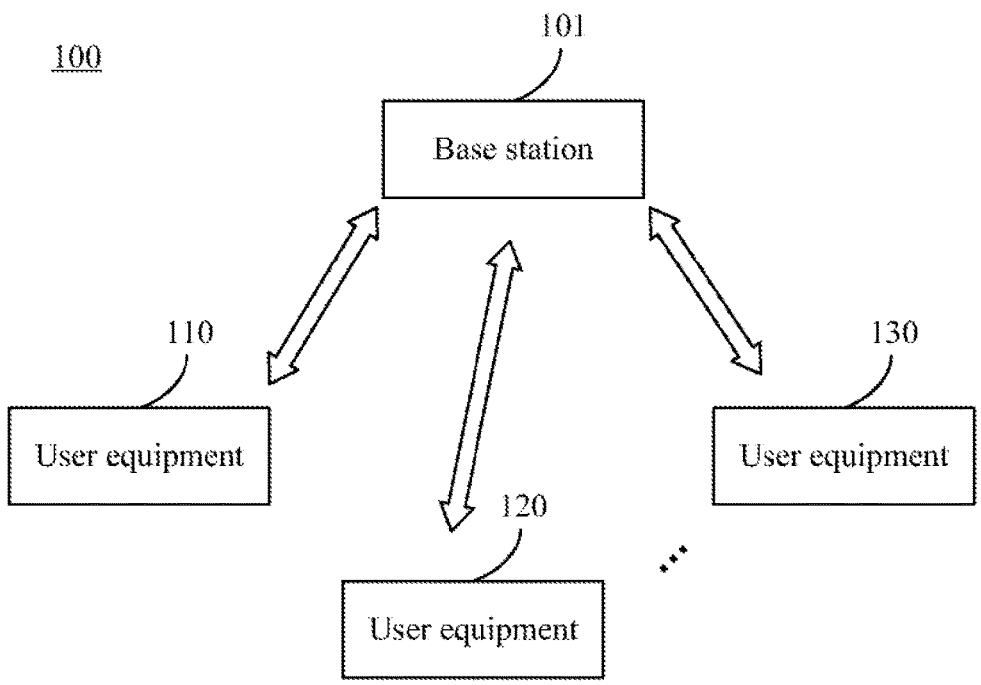
FIG. 2 is a diagram illustrating the structure of a wireless network according to the present application.

The embodiments of the present application may be applied to radio networks of different systems. Radio access networks may include different communication nodes in different systems. FIG. 2 is a diagram illustrating the structure of a radio network system according to the present application. As shown in FIG. 2, the radio network system 100 includes a base station 101, a user equipment 110, a user equipment 120 and a user equipment 130. The base station 101 performs wireless communication with the user equipment 110, the user equipment 120 and the user equipment 130.

In this embodiment of the present application, the base station may be a device capable of communicating with the user equipment. The base station may be any device having a wireless receiving-sending function, and includes, but is not limited to, a base station (NodeB), an evolved base station (eNodeB), a base station in the 5G communication system, a base station in a future communication system, an access node in a Wi-Fi system, a wireless relay node and a wireless return node. The base station may also be a radio controller in the cloud radio access network (CRAN) scenarios. The base station may also be a small site and a transmission reference point (TRP). This is not limited in this embodiment of the present application.

The user equipment is a device having a wireless receiving-sending function. The device may be deployed on land including being indoor or outdoor, handled, wearable or car-mounted; the device may also be deployed on water (for example, on ships); and the device may also be deployed in the air (for example, in airplanes, balloons and satellites). The user equipment may be a mobile phone, a tablet computer, a computer having a wireless receiving-sending function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city and a wireless terminal in a smart home. The application scenes are not limited in this embodiment of the present application. The user equipment may also sometimes be called a terminal, an access terminal, a UE unit, a UE station, a mobile, a mobile station, a remote station, a remote terminal, a mobile equipment, a UE terminal, a wireless communication device, a UE agent or a UE apparatus. This is not limited in this embodiment of the present application.

As an example, this embodiment of the present application includes one UE and at least two TRPs (or one TRP includes two panels). Repetitive PDCCHs or repetitive PDSCHs come from two different TRPs and may be on different CCs or BWPs or on the same CC or BWP.

Figure 1:
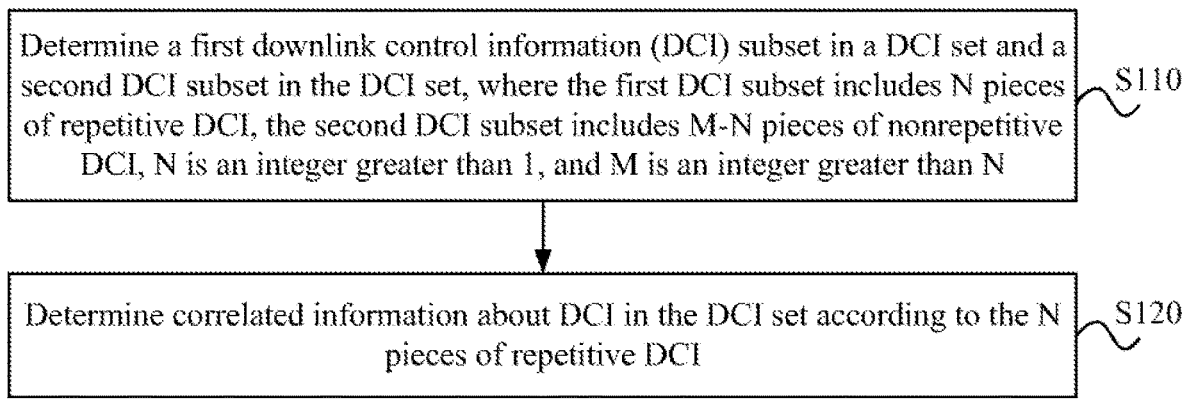
FIG. 1 is a flowchart of an information enhancement method according to the present application.

In an embodiment, FIG. 1 is a flowchart of an information enhancement method according to the present application. The method may be applied to the cases of the PDCCH repetitive transmission in the multi-TRP/panel scenarios. This method may be executed by an information enhancement apparatus provided by the present application. The information enhancement apparatus may be implemented by software and/or hardware and integrated on the user equipment (UE).

As shown in FIG. 1, the information enhancement method provided by this embodiment of the present application mainly includes S110 and S120.

In S110, a first DCI subset in a downlink control information (DCI) set and a second DCI subset in the DCI set are determined, where the first DCI subset includes N pieces of repetitive DCI, the second DCI subset includes M-N pieces of nonrepetitive DCI, N is an integer greater than 1, and M is an integer greater than N.

DCI refers to information carried in a PDDCH. Different types of the DCI may contain different domains and different contents in the domains.

For example, a downlink assignment index (DAI) is used for indicating that multiple subframes contain downlink transmission within the feedback time window of a Hybrid Automatic Repeat Request (HARQ) so as to prevent the UE from probably erroneously feeding back acknowledgment (ACK) when some of the DCI is lost. In the NR protocols, a DAI domain only exists in the DCI formats 0_1 and 1_1.

For example, a redundancy version (RV) refers to the starting position of data taken from a buffer. Different RV version data may be merged incrementally to improve decoding accuracy. In the NR protocols, an RV domain only exists in the DCI formats 0_1, 0_0, 1_0 and 1_1.

For another example, 4 bits in a time domain resource assignment (TDRA) domain in the DCI format 0_0 are used for indexing a slot offset K2 of a scheduled PUSCH relative to the DCI, the starting position S of a symbol within a slot of the scheduled PUSCH relative to the DCI and the length L of the symbol within the slot of the scheduled PUSCH relative to the DCI; and 4 bits in a TDRA domain in the DCI format 1_0 are used for indexing a slot offset K0 of a scheduled PDSCH relative to the DCI, the starting position S of a symbol within a slot of the scheduled PDSCH relative to the DCI and the length L of the symbol within the slot of the scheduled PDSCH relative to the DCI.

The PDCCH may send downlink scheduling information to the UE to instruct the UE to receive the PDSCH. The PDCCH may also send uplink scheduling information to the UE to instruct the UE to send the physical uplink shared channel (PUSCH). The PDCCH may also send the power control commands of a physical uplink control channel (PUCCH), the PUSCH and a sounding reference signal (SRS). The PDCCH may also have the slot format of the UE notified.

A control resource set (CORESET) is composed of one or more control channel elements (CCEs) and indicates that the base station may send the time-frequency resource position of the PDCCH. However, the UE does not know which form of the DCI the PDCCH carries or on which candidate CCE this form of the DCI is transmitted, so the UE needs to blindly demodulate all possible forms of the DCI on CCEs of different aggregation levels. To reduce the number of blind demodulation, the concept of search space (SS) is introduced. The SS is composed of CCE sets of given aggregation levels. The base station may configure one or more SSs for the UE. A time domain occasion is determined by a monitoring period in the SS and an offset in the SS and indicates that the base station may send the time domain position of the PDCCH. A component carrier (CC) represents a subcarrier and indicates a frequency domain position.

The UE knows its SS according to the configuration information of the base station. First, the UE tries using a corresponding radio network temporary identifier (RNTI), a possible DCI format and a possible aggregation level to conduct a cyclic redundancy check (CRC) on the CCE inside its SS. If the check turns out to be successful, the UE knows that it needs the information, thereby demodulating the content in the DCI.

The UE blindly detects the DCI on the corresponding search space (SS) according to the sequence of first time domain and then frequency domain and obtains the downlink assignment index (DAI). The content of the repetitive DCI has the same value of the DAI, so the value of the DAI violates the established rules after the blind demodulation, and the UE may get a misunderstanding by considering that a miss detection has occurred. That is, when the UE blindly demodulates the DCI, all the DCI cannot be guaranteed to be demodulated correctly, and the detection condition of the repetitive DCI and how to solve the problem of DAI misalignment need to be considered.

The DCI set includes M pieces of DCI. The M pieces of DCI include the N pieces of repetitive DCI and the M-N pieces of nonrepetitive DCI. The first DCI subset includes the N pieces of repetitive DCI. M is an integer greater than N. In an exemplary example, the method further includes receiving preconfigured correlation of the N pieces of repetitive DCI, where the correlation is used for determining the repetitive DCI.

The configured correlation of the N pieces of repetitive DCI includes at least one of the following.

Each piece of repetitive DCI is added with a search space reference (SSREF) domain in the search space (SS), where the content in the SSREF domain is not the search space identifier (SSID) of the current DCI;

Each piece of repetitive DCI is added with a control resource set reference (CORESETREF) domain on the control resource set (CORESET), where the content in the CORESETREF domain is not the control resource set identifier (CORESETID) of the current DCI;

A high layer repetitive signaling rule is predefined, where the repetitive signaling rule includes at least one of the following: Each piece of repetitive DCI is configured with the same first information element in the SS, where the first information element includes at least one of the following: the first duration, the monitoring slot period, a monitoring slot period offset, the number of candidate PDDCHs, the DCI format or the position of a symbol within a monitoring slot; or each piece of repetitive DCI is configured with the same second information element, where the second information element includes at least one of the following: the second duration, a type of a mapping of a control channel element to a resource element group, a frequency domain resource, an interleaving size, a scrambling ID of a DMRS of a PDCCH, the precoding granularity, a transmission control information set, a shift catalog or the number of resource group bindings.

In an embodiment, the base station configures M CORESETs or M SSs for the UE and indicates to the UE that the DCI on N CORESETs in the M CORESETs is repetitive or the DCI on N SSs in the M SSs is repetitive, where M and N are positive integers, and M>N>1, for example, M=4, and N=2.

In this embodiment of the present application, any one or a combination of more of the following manners may be used for configuring reference information for the repetitive DCI.

In a first manner: the base station only configures reference information for the SS in which 2 pieces of repetitive DCI are located and does not configure reference information for the SS in which another 2 pieces of nonrepetitive DCI are located.

If the DCI on the first SS and the DCI on the second SS are repetitive, and the ID corresponding to the first SS is SSID1, and the ID corresponding to the second SS is SSID2, then an SSREF domain is added on the first SS, and the content in the SSREF domain is SSID2; and an SSREF domain is added on the second SS, and the content in the SSREF domain is SSID1.

In a second manner: the base station only configures reference information for the CORESET in which 2 pieces of repetitive DCI are located and does not configure reference information for the CORESET in which another 2 pieces of nonrepetitive DCI are located.

If the DCI on the first CORESET and the DCI on the second CORESET are repetitive, and the ID corresponding to the first CORESET is CORESETID1, and the ID corresponding to the second CORESET is CORESETID2, then a CORESETREF domain is added on the first CORESET, and the content in the CORESETREF domain is CORESETID2; and a CORESETREF domain is added on the second CORESET, and the content in the CORESETREF domain is CORESETID1.

In a third manner, the base station configures the repetitive signaling rule.

Configuring the repetitive signaling rule includes at least one of the following: The same one or more first information elements are configured for the 2 pieces of repetitive DCI in the SS; a different one or more first information elements are configured for the 2 pieces of nonrepetitive DCI in the SS; the same one or more second information elements are configured for the 2 pieces of repetitive DCI on the CORESET; or a different one or more second information elements are configured for the 2 pieces of nonrepetitive DCI on the CORESET.

The first information element may include at least of the following: the first duration, the monitoring slot period, the monitoring slot period offset, the number of the candidate PDCCHs, the DCI format or the position of the symbol within the monitoring slot. The second information element may include at least of the following: the second duration, the type of the mapping of the control channel element to the resource element group, the frequency domain resource, the interleaving size, the scrambling ID of the DMRS of the PDCCH, the precoding granularity, the transmission control information set, the shift catalog or the number of the resource group bindings.

For example, the search space (SS) is configured with the same first duration, the same monitoring slot period, the same monitoring slot period offset, the same number of the candidate PDCCHs, the same DCI format and the same position of the symbol within the monitoring slot.

For example, the control resource set (CORESET) is configured with the same second duration, the same type of the mapping the control channel element to the resource element group, the same frequency domain resource, the same interleaving size, the same scrambling ID of the DMRS of the PDCCH, the same precoding granularity, the same transmission control information set, the same shift catalog or the same number of the resource group bindings.

According to the information of the M CORESETs configured by the base station or the information of the M SSs configured by the base station and the rules of the repetitive DCI indicated by the base station, the UE determines the time-frequency resource position of the blindly-demodulated DCI, the number of the DCI requiring blind demodulation and the time-frequency resource position of the repetitive DCI.

In an embodiment, determining the N pieces of repetitive DCI in the DCI set includes at least one of the following: N pieces of DCI satisfying the high layer repetitive signaling rule in the DCI set are determined as the repetitive DCI; N pieces of DCI having a search space reference (SSREF) domain in the search space (SS) in the DCI set are determined as the repetitive DCI; or N pieces of DCI having a control resource reference (CORESETREF) domain on the control resource set (CORESET) in the DCI set are determined as the repetitive DCI; where each of all domains included in the N pieces of DCI have the same content.

In an embodiment, determining the N pieces of repetitive DCI in the DCI set may be that the UE detects that the first SS and the second SS each have an SSREF domain, the contents in the SSREF domains are SSID2 and SSID1 respectively, SSID1 corresponds to the first SS, and SSID2 corresponds to the second SS, so the DCI on the first SS and the DCI on the second SS are determined as the repetitive DCI.

In an embodiment, determining the N pieces of repetitive DCI in the DCI set may also be that the UE detects that the first CORESET and the second CORESET each have a CORESETREF domain, the contents in the CORESETREF domains are CORESETID2 and CORESETID1 respectively, CORESETID1 corresponds to the first CORESET, and CORESETID2 corresponds to the second CORESET, so the DCI on the first CORESET and the DCI on the second CORESET are determined as the repetitive DCI.

In an embodiment, determining the N pieces of repetitive DCI in the DCI set may also be that when at least one or more same first information elements are detected in the SS, the DCI in the SS is determined as the repetitive DCI. The first information element may include at least of the following: the first duration, the monitoring slot period, the monitoring slot period offset, the number of the candidate PDCCHs, the DCI format or the position of the symbol within the monitoring slot.

In an embodiment, determining the N pieces of repetitive DCI in the DCI set may also be that when at least one or more same second information elements are detected on the CORESET, the DCI on the CORESET is determined as the repetitive DCI. The second information element may include at least one of the following: the second duration, the type of the mapping of the control channel element to the resource element group, the frequency domain resource, the interleaving size, the scrambling ID of the DMRS of the PDCCH, the precoding granularity, the transmission control information set, the shift catalog or the number of the resource group bindings.

In S120, correlated information about the DCI in the DCI set is determined according to the repetitive DCI.

In an embodiment, determining the correlated information about the DCI in the DCI set according to the repetitive DCI includes one of the following manners.

The value of a downlink assignment index (DAI) of the DCI set is determined according to the repetitive DCI; the transmission slot of a resource scheduled by the repetitive DCI is determined according to the repetitive DCI; a redundancy version (RV) of the repetitive DCI is determined according to the repetitive DCI; the value of the DAI of the DCI set and the transmission slot of the resource scheduled by the repetitive DCI are determined according to the repetitive DCI; or the value of the downlink assignment index (DAI) of the DCI set and the redundancy version (RV) of the repetitive DCI are determined according to the repetitive DCI.

The DCI set includes the M pieces of DCI. The M pieces of DCI include the N pieces of repetitive DCI and the M-N pieces of nonrepetitive DCI. The first DCI subset includes the N pieces of repetitive DCI. M is a positive integer, and M>N.

In an embodiment, the value of the downlink assignment index (DAI) of the DCI set is determined according to the repetitive DCI.

In an embodiment, determining the value of the downlink assignment index (DAI) of the DCI set according to the repetitive DCI includes determining the value of the DAI of the DCI set according to the detection result of the N pieces of repetitive DCI in the first DCI subset, where the DAI of the repetitive DCI in the first DCI subset has the same value.

Figure 3:
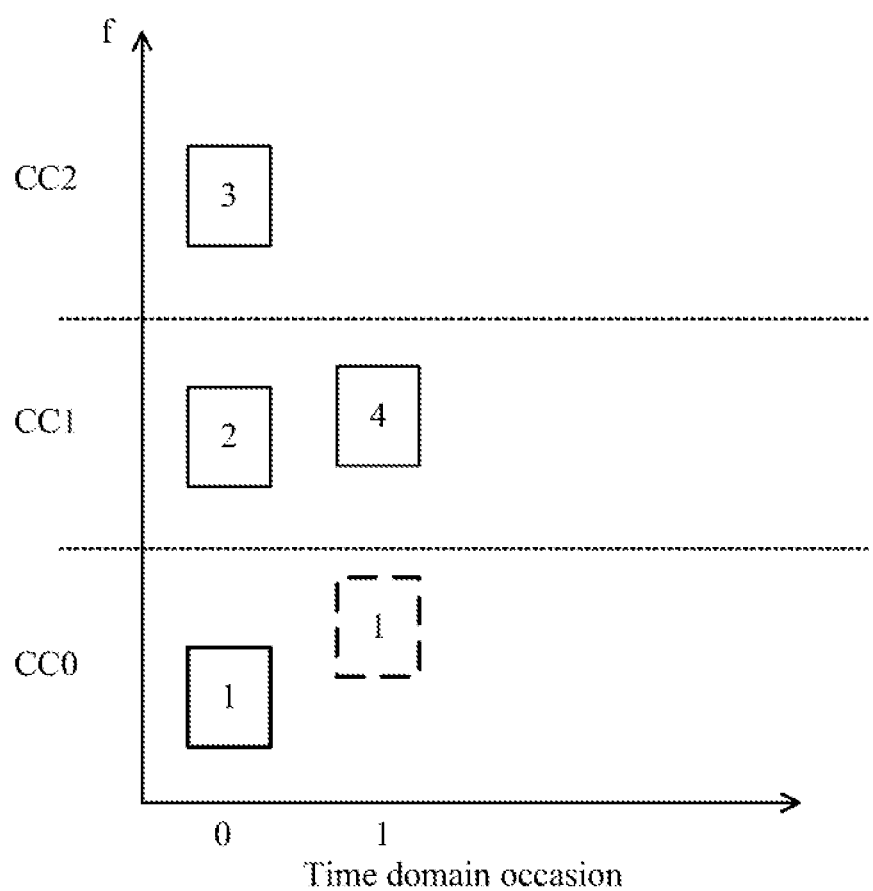
FIG. 3 is a diagram of the value of a DAI when all repetitive DCI is detected according to the present application.

In this embodiment of the present application, the UE may determine the DCI in which positions are repetitive according to the reference information of the base station. FIG. 3 is a diagram of the value of a DAI when all repetitive DCI is detected according to the present application. As shown in FIG. 3, the UE sequentially blindly demodulates the DCI in the positions of (occasion 0, CC0), (occasion 0, CC1), (occasion 0, CC2), (occasion 1, CC0) and (occasion 1, CC1) and knows that the DCI on the (occasion 0, CC0) and the DCI on the (occasion 1, CC0) are repetitive. That is, in FIG. 3, the DCI of 1 in the dashed box position and the DCI of 1 in the solid box position are repetitive. However, when the UE blindly demodulates the DCI, all the DCI cannot be guaranteed to be demodulated correctly, and the detection condition of the repetitive DCI and how to solve the problem of DAI misalignment need to be considered.

Figure 4:
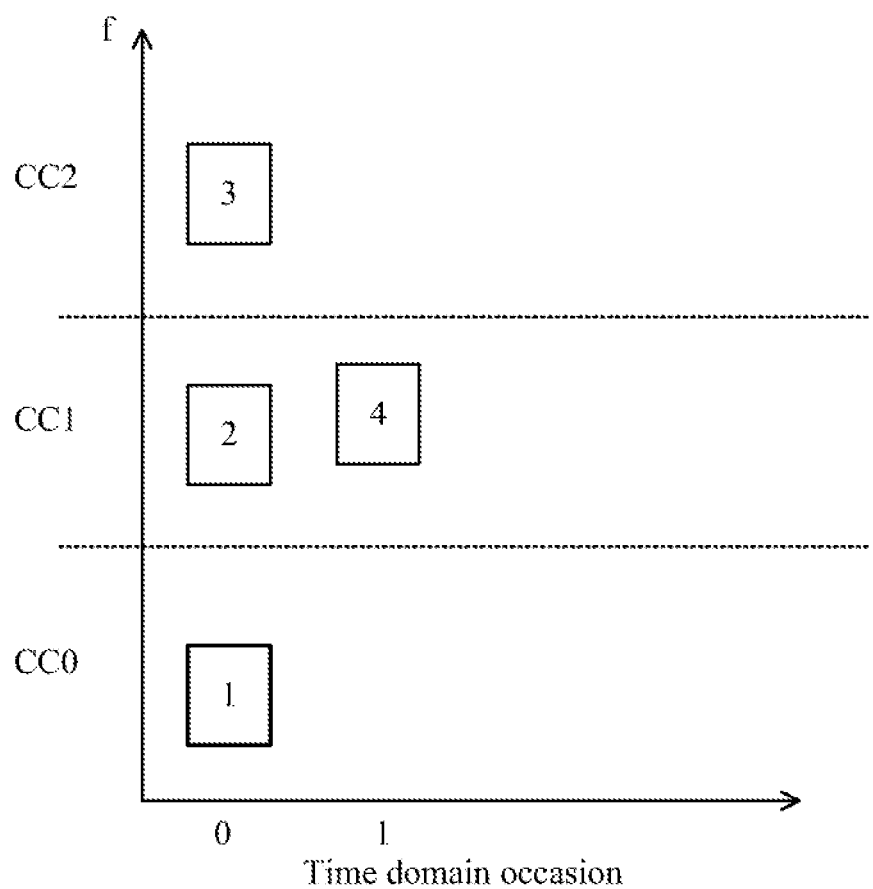
FIG. 4 is a diagram of calculation of a DAI according to the present application.

FIG. 4 is a diagram of calculation of a DAI according to the present application. As shown in FIG. 4, the calculation of the value of the DAI is modulo-4 addition 1 of the result after accumulation according to the sequence of first time domain and then frequency domain.

Figure 5:
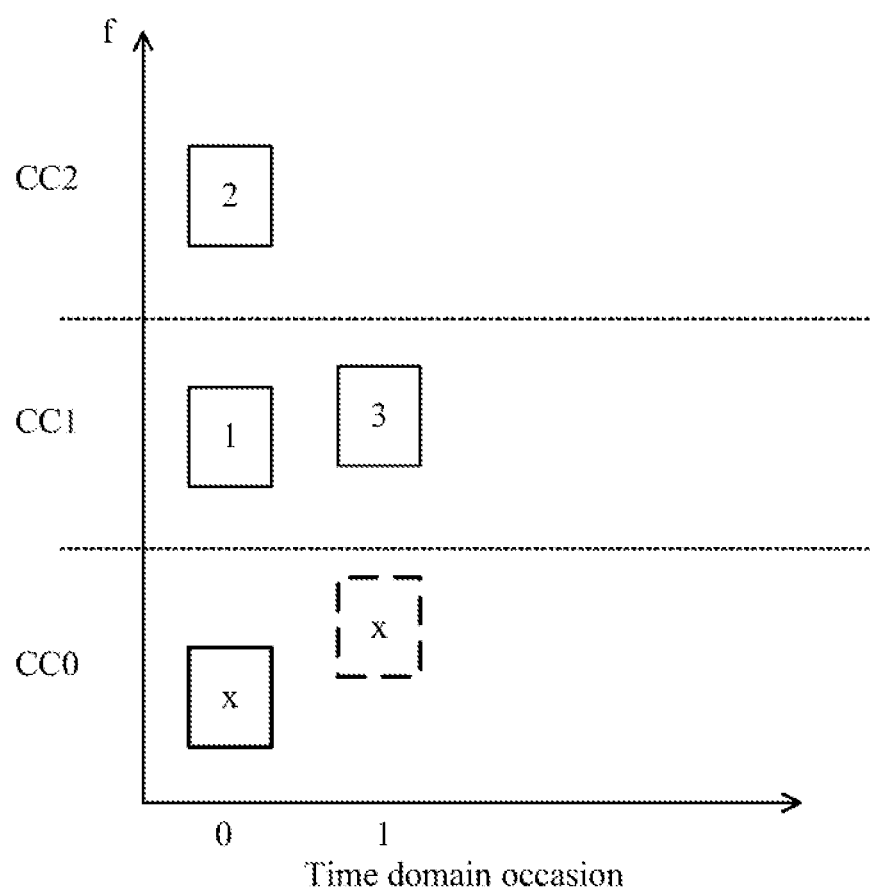
FIG. 5 is a diagram of the value of a DAI when repetitive DCI is undetected according to the present application.

In an embodiment, if any of the repetitive DCI in the first DCI subset is undetected, the value of the DAI of the DCI set is determined according to the sequence of the DCI actually detected. FIG. 5 is a diagram of the value of a DAI when repetitive DCI is undetected according to the present application. As shown in FIG. 5, the repetitive DCI is undetected. That is, in FIG. 5, 1 in the solid box position and 1 in the dashed box position are undetected, so the UE calculates the value of the DAI according to the sequence of the DCI actually detected and not the reserved value of the DAI in the DCI. That is, the final DAI value is 123 instead of 234.

In an embodiment, if at least one piece of repetitive DCI in the first DCI subset is detected, then the DCI having the minimum time domain occasion index and the minimum carrier spacing parameter in the first DCI subset is determined as the target DCI, the DAI in the first DCI subset is placed in the position of the target DCI, and the value of the DAI of the DCI set is determined according to the DAI of the target DCI and the DAI of the nonrepetitive DCI in the DCI set, where the position of the DAI is codetermined by the time domain occasion index and the component carrier index.

The value of the DAI in the position of the non-target DCI in the first DCI subset is omitted, the relative sequence between the DAI of the nonrepetitive DCI in the DCI set remains unchanged, and the relative sequence between the DAI of the nonrepetitive DCI in the DCI set and the DAI of the target DCI remains unchanged, where the value of the DAI of the nonrepetitive DCI in the DCI set is determined according to the content of a DAI domain in the DCI detected.

FIG. 3 is a diagram of the value of a DAI when all repetitive DCI is detected according to the present application. As shown in FIG. 3, two pieces of DCI are detected, that is, 1 in the solid box position and 1 in the dashed box position are detected. The UE determines that the DCI in the positions of 1 in the solid box and the dashed box are repetitive according to the detection result and the configuration of the base station, and the value of the DAI is 12314 after the blind demodulation. At this time, the UE has known that 1 in the first solid box and 1 in the second dashed box are repetitive, the target DCI in the repetitive DCI is located in the position of 1 in the first solid box, and the final DAI value is 1234.

Figure 6:
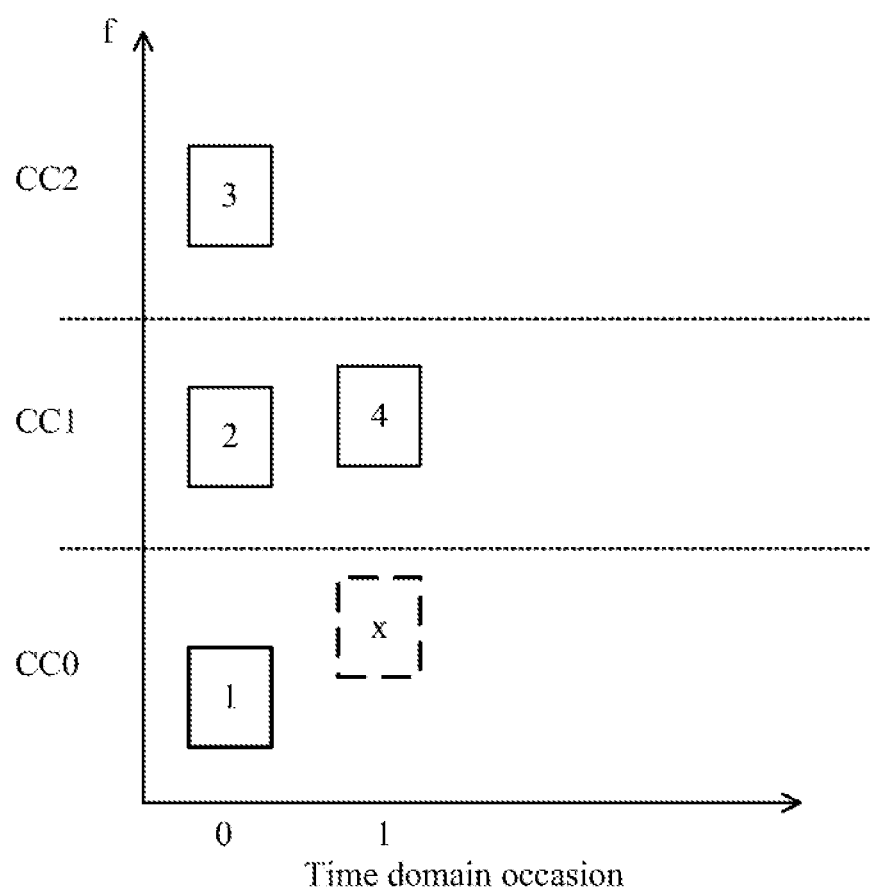
FIG. 6 is a diagram of the value of a DAI when only the front repetitive DCI is detected according to the present application.

FIG. 6 is a diagram of the value of a DAI when only the front repetitive DCI is detected according to the present application. Only the foremost repetitive DCI is detected. That is, in FIG. 6, 1 in the solid box is detected while 1 in the dashed box is undetected. The target DCI in the repetitive DCI is located in the position of 1 in the first solid box, and the value of the DAI is 1234 after the blind demodulation performed by the UE, which is a normal value.

Figure 7:
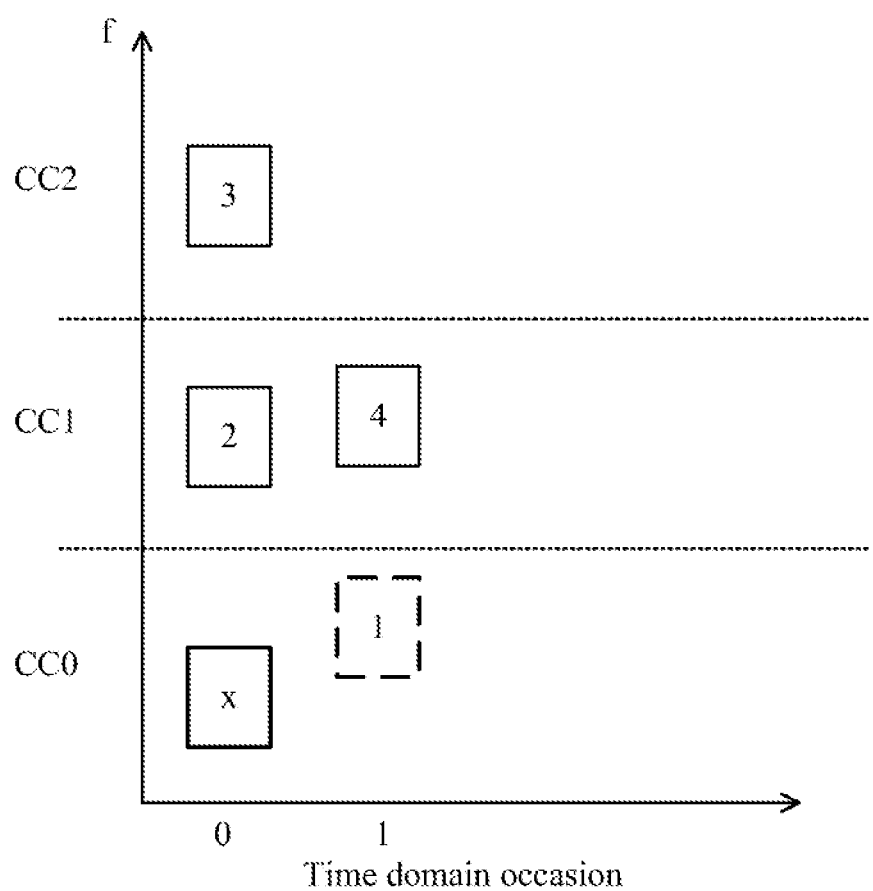
FIG. 7 is a diagram of the value of a DAI when only the rear repetitive DCI is detected according to the present application.

FIG. 7 is a diagram of the value of a DAI when only the rear repetitive DCI is detected according to the present application. Only the rearmost repetitive DCI is detected. That is, in FIG. 7, 1 in the solid box is undetected while 1 in the dashed box is detected. The value of the DAI is 2341 after the blind demodulation performed by the UE. The UE knows that the DCI of 1 in the solid box and the DCI of 1 in the dashed box are repetitive. Although the DCI in the position of 1 in the solid box is undetected, the target DCI in the repetitive DCI is located in the position of 1 in the first solid box, so the final DAI value is 1234.

Figure 8:
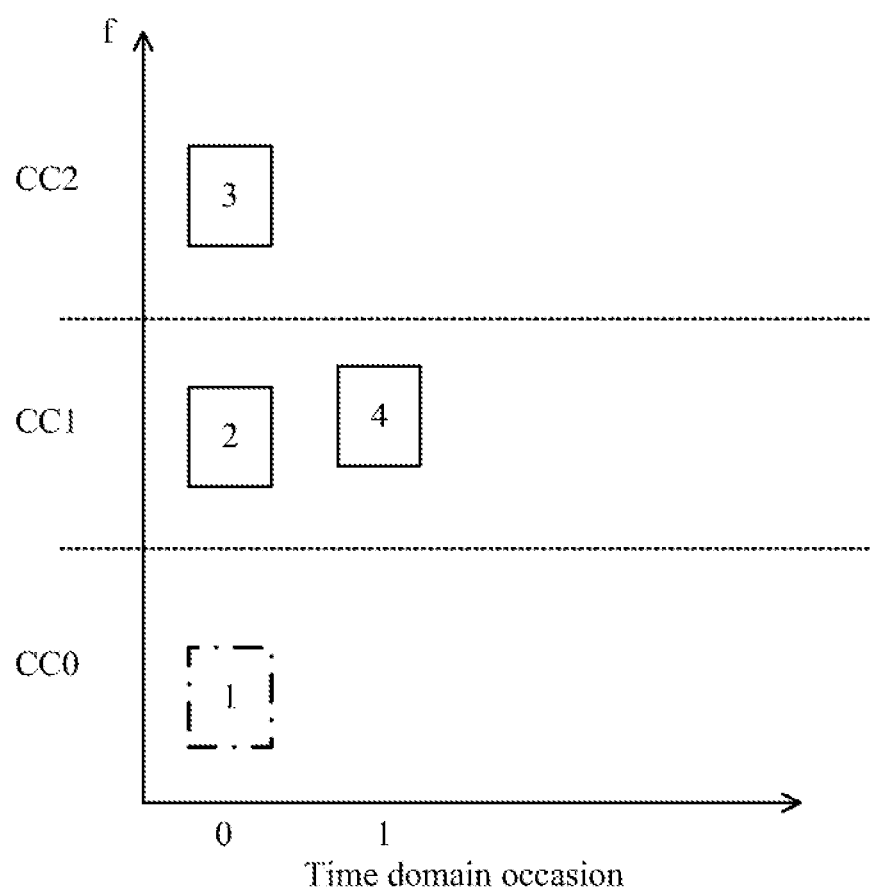
FIG. 8 is a diagram of the final DAI value when at least one piece of repetitive DCI is detected according to the present application.

FIG. 8 is a diagram of the sequence of a final DAI when at least one piece of repetitive DCI is detected according to the present application. In the preceding three cases where at least one piece of repetitive DCI is detected, the final DAI value of the repetitive DCI needs to be placed in the position of the DCI having the minimum time domain occasion index and the minimum component carrier index in the repetitive DCI, which corresponds to the position of 1 in the solid box of FIG. 8, and the final DAI value is 1234, which is obtained according to the OR operations.

In an embodiment, the transmission slot of the resource scheduled by the repetitive DCI is determined according to the repetitive DCI.

In an embodiment, determining the N pieces of repetitive DCI in the DCI set includes determining the N pieces of DCI satisfying the high layer repetitive signaling rule in the DCI set as the repetitive DCI; determining the N pieces of DCI having the search space reference (SSREF) domain in the search space (SS) in the DCI set as the repetitive DCI; and determining the N pieces of DCI having the control resource reference (CORESETREF) domain on the control resource set (CORESET) in the DCI set as the repetitive DCI; where each of the all domains included in the N pieces of DCI have the same content.

In this embodiment, determining the N pieces of repetitive DCI in the DCI set is basically the same as determining the N pieces of repetitive DCI in the DCI set provided in the preceding embodiment, and the implementation may be referred to the description in the preceding embodiment and thereby is not repeated in this embodiment.

In an embodiment, the type of the resource scheduled by the repetitive DCI and the number of the resources scheduled by the repetitive DCI are determined, where the type of the resource includes at least one of the following: a physical downlink shared channel (PDSCH), a physical uplink shared channel (PUSCH) or an aperiodic sounding reference signal (AP SRS).

The N pieces of repetitive DCI are transmitted in N different transmission slots, and the repetitive DCI schedules the same resource.

In an embodiment, the method further includes receiving configured first resource information, where the first resource information includes the type of the resource scheduled by the repetitive DCI, the number of the resources scheduled by the repetitive DCI and reference DCI of the resource scheduled by the repetitive DCI; and the type of the resource includes at least one of the following: the physical downlink shared channel (PDSCH), the physical uplink shared channel (PUSCH) or the aperiodic sounding reference signal (AP SRS). The first resource information is configured by the base station.

In an embodiment, determining the transmission slot of the resource scheduled by the repetitive DCI includes determining, according to reference DCI of the N pieces of repetitive DCI, the transmission slot of the resource scheduled by the repetitive DCI. The reference DCI includes at least one of the following: the DCI having the minimum transmission slot among the N pieces of repetitive DCI; the DCI having the maximum transmission slot among the N pieces of repetitive DCI; the DCI corresponding to the minimum control resource set identifier among the N pieces of repetitive DCI; the DCI corresponding to the maximum control resource set identifier among the N pieces of repetitive DCI; the DCI corresponding to the minimum search space identifier among the N pieces of repetitive DCI; or the DCI corresponding to the maximum search space identifier among the N pieces of repetitive DCI.

In an embodiment, the base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can only schedule one PDSCH in different slots.

The base station configures that the repetitive DCI can only schedule the one PDSCH in the different slots, and the DCI having the minimum transmission slot determines the position of the PDSCH.

According to the information of the M CORESETs configured by the base station or the information of the M SSs configured by the base station and the rules of the repetitive DCI indicated by the base station, the UE determines the time-frequency resource position of the blindly-demodulated DCI, the number of the DCI requiring blind demodulation and the time-frequency resource position of the repetitive DCI.

The UE determines the type of the final scheduled resource and the number of the final scheduled resource according to the number of the PDSCH resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule the same PDSCH, so a slot offset problem exists between the repetitive DCI having a rear transmission slot and the scheduled PDSCH.

Figure 9:
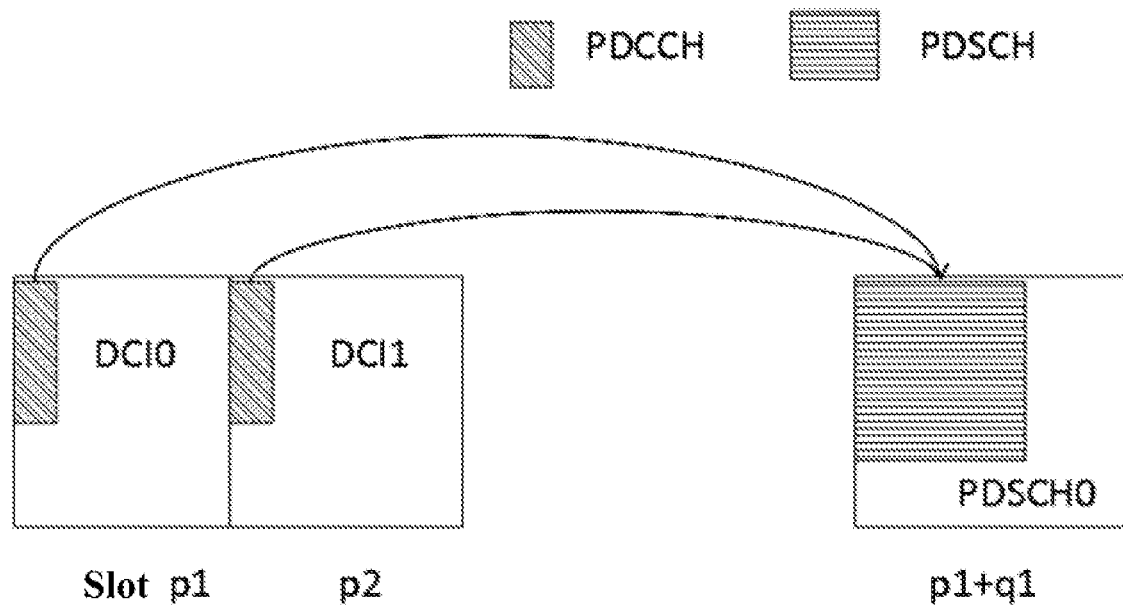
FIG. 9 is a diagram of a structure in which repetitive DCI schedules one PDSCH in different slots according to the present application.

FIG. 9 is a diagram of a structure in which repetitive DCI schedules one PDSCH in different slots according to the present application. As shown in FIG. 9, DCI0 and DCI1 are repetitive and both schedule a PDSCH1, and DCI0, DCI1 and PDSCH are located in slot p1, slot p2 and slot p1+q1 respectively, where p2>p1>0, and q1>(p2−p1).

If the transmission slot of the PDSCH scheduled by the DCI is determined according to the correlated protocols, then DCI0 and DCI1 schedule different PDSCHs. To ensure that the same PDSCH is scheduled, the transmission slot of the PDSCH scheduled by DCI1 should be calculated with reference to DCI0.

When the resource scheduled by the repetitive DCI is the PDSCH, the transmission slot TD of the PDSCH is determined by a transmission slot n1 of the reference DCI, a carrier spacing parameter μPDSCH of the PDSCH, K0 and a carrier spacing parameter μPDCCH of the physical downlink control channel corresponding to the DCI, where K0 denotes a transmission slot bias between the reference DCI and the PDSCH and may be 0 or 1.

The N pieces of repetitive DCI schedule one PDSCH. A reference slot of the PDSCH is the slot in which the DCI having the minimum slot in the repetitive DCI is located. The transmission slot of the PDSCH is:

$$TD = \left\lfloor n1 \times \frac{2^{\mu_{PDSCH}}}{2^{\mu_{PDCCH}}} \right\rfloor + K_0.$$

TD denotes the transmission slot of the PDSCH scheduled by the repetitive DCI. N1 is a positive integer. PDSCH denotes the carrier spacing parameter of the PDSCH. μPDCCH denotes the carrier spacing parameter of the physical downlink control channel (PDCCH). K0 denotes the slot offset between the repetitive DCI and the PDSCH scheduled by the repetitive DCI and is determined by numerology information of the PDSCH. K0 may be 0 or 1. N1 denotes the slot in which the DCI having the minimum slot in the first DCI subset is located.

In an embodiment, the base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can only schedule one PDSCH in different slots.

The base station configures that the repetitive DCI is located in different slots and schedules one PDSCH, and the DCI having the minimum transmission slot determines the position of the PDSCH.

The base station configures that the repetitive DCI is located in the different slots and schedules the one PDSCH, and when a spatial correlation parameter is determined, the time interval between the DCI and the PDSCH is the time interval between the DCI having the maximum transmission slot and the scheduled PDSCH.

According to the information of the M CORESETs configured by the base station or the information of the M SSs configured by the base station and the rules of the repetitive DCI indicated by the base station, the UE determines the time-frequency resource position of the blindly-demodulated DCI, the number of the DCI requiring blind demodulation and the time-frequency resource position of the repetitive DCI.

The UE determines the type of the final scheduled resource and the number of the final scheduled resource according to the number of the PDSCH resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule the same PDSCH, the repetitive DCI having the minimum transmission slot determines the position of the PDSCH, and when the foremost repetitive DCI determines the spatial correlation parameter, the time interval between the repetitive DCI and the PDSCH is the time interval between the DCI having the maximum transmission slot and the scheduled PDSCH.

As shown in FIG. 9, DCI0 and DCI1 are repetitive and both schedule the PDSCH0, DCI0, DCI1 and PDSCH0 are located in slot p1, slot p2 and slot p1+q1 respectively, where p2>p1>0, and q1>(p2−p1).

If the time interval between the DCI and the scheduled PDSCH is determined according to the correlated protocols, the time interval between DCI0 and the scheduled PDSCH is greater than the time interval between DCI1 and the scheduled PDSCH. To ensure that a default receive beam of the same criteria exists, when the spatial correlation parameter is determined, the time interval between DCI0 and the scheduled PDSCH is calculated with reference to the time interval between DCI1 and the scheduled PDSCH.

The time interval between the repetitive DCI and the scheduled PDSCH is determined according to the difference between the transmission slot of the PDSCH and the transmission slot n2 of second reference DCI. The spatial correlation parameter of the PDSCH is determined according to the time interval. The second reference DCI is any DCI other than the first reference DCI in the reference DCI.

The time interval between the repetitive DCI and the scheduled PDSCH is:

$$Td = \left\lfloor n1 \cdot \frac{2^{\mu_{PDSCH}}}{2^{\mu_{PDCCH}}} \right\rfloor + K_0 - n2.$$

Td denotes the time interval between the repetitive DCI and the PDSCH. N1 is a positive integer and denotes the slot in which the repetitive DCI having the minimum slot is located. N2 denotes the slot in which the repetitive DCI having the maximum slot is located. μPDSCH denotes the carrier spacing parameter of the PDSCH. μPDCCH denotes the carrier spacing parameter of the PDCCH. K0 denotes the slot offset between the repetitive DCI and the PDSCH scheduled by the repetitive DCI and is determined by numerology information of the PDSCH. K0 may be 0 or 1. N1 and n2 are each a positive integer.

In an embodiment, the base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can only schedule one PUSCH in different slots.

The base station configures that the repetitive DCI is located in different slots and schedules one PUSCH, and the DCI having the minimum transmission slot determines the position of the PUSCH.

According to the information of the M CORESETs configured by the base station or the information of the M SSs configured by the base station and the rules of the repetitive DCI indicated by the base station, the UE determines the time-frequency resource position of the blindly-demodulated DCI, the number of the DCI requiring blind demodulation and the time-frequency resource position of the repetitive DCI.

The UE determines the type of the final scheduled resource and the number of the final scheduled resource according to the number of the PUSCH resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule the same PUSCH, and the DCI having the minimum transmission slot determines the position of the PUSCH, so a slot offset problem exists between the repetitive DCI having a rear transmission slot and the scheduled PUSCH.

Figure 10:
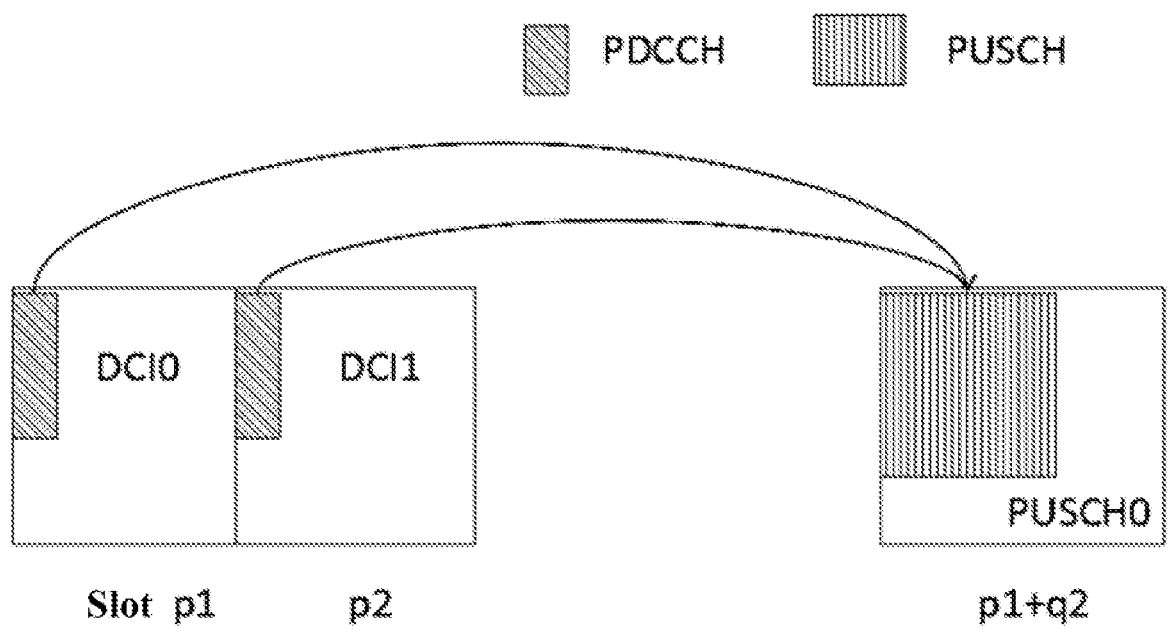
FIG. 10 is a diagram of a structure in which repetitive DCI schedules one PUSCH in different slots according to the present application.

FIG. 10 is a diagram of a structure in which repetitive DCI schedules one PUSCH in different slots according to the present application. As shown in FIG. 10, DCI0 and DCI1 are repetitive and both schedule a PUSCH0, and DCI0, DCI1 and PUSCH0 are located in slot p1, slot p2 and slot p1+q2 respectively, where p2>p1>0, and q2>(p2−p1).

If the transmission slot of the PUSCH scheduled by the DCI is determined according to the correlated protocols, then DCI0 and DCI1 schedule different PUSCHs. To ensure that the same PUSCH is scheduled, the transmission slot of the PUSCH scheduled by DCI1 should be calculated with reference to DCI0.

When the resource scheduled by the repetitive DCI is the physical uplink shared channel (PUSCH), the transmission slot TU of the PUSCH is determined by the transmission slot n1 of the reference DCI, a carrier spacing parameter μPUSCH of the PUSCH, K1 and a carrier spacing parameter μPDCCH of the physical downlink control channel corresponding to the DCI, where K1 denotes a transmission slot bias between the reference DCI and the PUSCH.

The N pieces of repetitive DCI schedule one PUSCH. A reference slot of the PUSCH is the slot in which the DCI having the minimum slot in the repetitive DCI is located. The transmission slot of the PUSCH is:

$$TU = \left\lfloor n1 \times \frac{2^{\mu_{PDSCH}}}{2^{\mu_{PDCCH}}} \right\rfloor + K_1.$$

TU denotes the transmission slot of the PUSCH scheduled by the repetitive DCI. N1 denotes the slot in which the repetitive DCI having the minimum slot is located. $\mu_{PUSCH}$ denotes the carrier spacing parameter of the PUSCH. μPDCCH denotes the carrier spacing parameter of the PDCCH. K1 denotes the slot offset between the repetitive DCI and the PUSCH scheduled by the repetitive DCI and is determined by numerology information of the PUSCH. K1 is any positive integer from 1 to 6.

In an embodiment, the base station configures M CORESETs or M SSs for the UE and indicates to the UE that the DCI on N CORESETs is repetitive or the DCI on N SSs is repetitive, where M and N are positive integers, and M>N>1, for example, M=4, and N=2. At least one piece of repetitive DCI is detected.

The base station configures that the repetitive DCI can only schedule one AP SRS in different slots.

The base station configures that the repetitive DCI is located in different slots and schedules one AP SRS, and the DCI having the minimum transmission slot determines the position of the AP SRS.

According to the information of the M CORESETs configured by the base station or the information of the M SSs configured by the base station and the rules of the repetitive DCI indicated by the base station, the UE determines the time-frequency resource position of the blindly-demodulated DCI, the number of the DCI requiring blind demodulation and the time-frequency resource position of the repetitive DCI.

The UE determines the type of the final scheduled resource and the number of the final scheduled resource according to the number of the AP SRS resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule the same AP SRS, and the DCI having the minimum transmission slot determines the position of the AP SRS, so a slot offset problem exists between the repetitive DCI having a rear transmission slot and the scheduled AP SRS.

Figure 11:
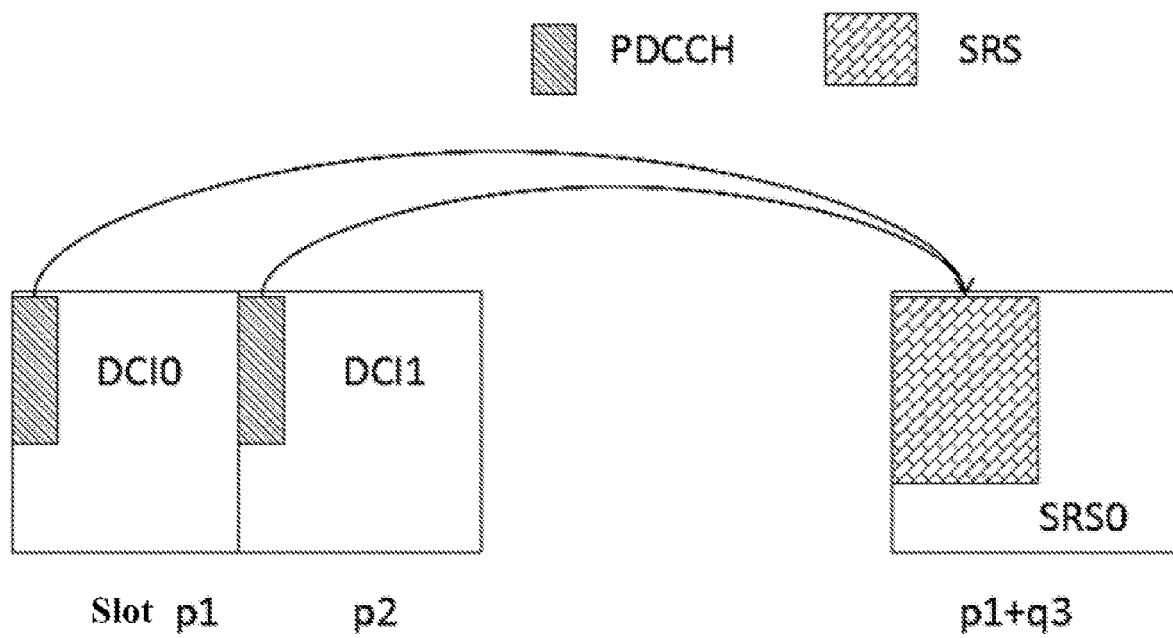
FIG. 11 is a diagram of a structure in which repetitive DCI schedules one AP SRS in different slots according to the present application.

FIG. 11 is a diagram of a structure in which repetitive DCI schedules one AP SRS in different slots according to the present application. As shown in FIG. 11, DCI0 and DCI1 are repetitive and both schedule an SRS0, and DCI0, DCI1 and SRS0 are located in slot p1, slot p2 and slot p1+q3 respectively, where p2>p1>0, and q3>(p2−p1).

If the transmission slot of the AP SRS triggered by the DCI is determined according to the correlated protocols, then DCI0 and DCI1 trigger different AP SRSs. To ensure that the same AP SRS is triggered, the transmission slot of the AP SRS triggered by DCI1 should be calculated with reference to DCI0.

When the resource scheduled by the repetitive DCI is the AP SRS, the transmission slot TA of the AP SRS is determined by the transmission slot n1 of the reference DCI, a carrier spacing parameter μSRS of the AP SRS, k and a carrier spacing parameter μPDCCH of the physical downlink control channel corresponding to the DCI, where k denotes a transmission slot bias between the reference DCI and the AP SRS, is determined by a slot offset parameter in an SRS resource set in higher-layer signaling and is any integer from 0 to 32.

The N pieces of repetitive DCI schedule one AP SRS. A resource transmission slot is the slot in which the DCI having the minimum slot in the repetitive DCI is located. The transmission slot of the AP SRS is:

$$TA = \left\lfloor n1 \times \frac{2^{\mu_{SRS}}}{2^{\mu_{PDCCH}}} \right\rfloor + k.$$

TA denotes the transmission slot of the AP SRS scheduled by the repetitive DCI. N1 denotes the slot in which the repetitive DCI having the minimum slot is located. μSRS denotes the carrier spacing parameter of the SRS. μPDCCH denotes the carrier spacing parameter of the PDDCH. K denotes the slot offset between the DCI and the AP SRS scheduled by the DCI, is determined by the slot offset parameter in the SRS resource set in the high layer signaling and is an integer from 0 to 32.

In an embodiment, the redundancy version (RV) of the repetitive DCI is determined by the repetitive DCI.

In an embodiment, determining the N pieces of repetitive DCI in the DCI set includes at least one of the following: the N pieces of DCI satisfying the high layer repetitive signaling rule in the DCI set are determined as the repetitive DCI; the N pieces of DCI having the search space reference (SSREF) domain in the search space (SS) in the DCI set are determined as the repetitive DCI; or the N pieces of DCI having the control resource reference (CORESETREF) domain on the control resource set (CORESET) in the DCI set are determined as the repetitive DCI.

In this embodiment, determining the N pieces of repetitive DCI in the DCI set is basically the same as determining the N pieces of repetitive DCI in the DCI set provided in the preceding embodiment, and the implementation may be referred to the description in the preceding embodiment and thereby is not repeated in this embodiment.

The type of the resource scheduled by the repetitive DCI and the number of the resources scheduled by the repetitive DCI are determined, where the type of the resource includes at least one of the following: the physical downlink shared channel (PDSCH) or the physical uplink shared channel (PUSCH).

The N pieces of repetitive DCI are transmitted in N different transmission slots, and the repetitive DCI schedules multiple resources.

In an embodiment, determining the redundancy version (RV) of the repetitive DCI includes determining the redundancy version (RV) of the repetitive DCI according to a configured redundancy version (VR) remapping rule and a detection result of the repetitive DCI.

In an embodiment, the method further includes receiving preconfigured second resource information, where the second resource information includes the type of the resource scheduled by the repetitive DCI, the number of the resources scheduled by the repetitive DCI and the redundancy version (VR) of the repetitive DCI; and the type of the resource includes at least one of the following: the physical downlink shared channel (PDSCH) or the physical uplink shared channel (PUSCH).

In an embodiment, when the N pieces of repetitive DCI schedule N PDSCHs, the redundancy version (RV) in the repetitive DCI is remapped according to a predetermined rule.

In an embodiment, when the N pieces of repetitive DCI schedule N PUSCHs, the redundancy version (RV) in the repetitive DCI is remapped according to a predetermined rule.

In an embodiment, the base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can schedule multiple PDSCHs in different slots.

The base station configures that the repetitive DCI schedules the PDSCHs in the different slots and configures the remapping rule of the RV of the repetitive DCI.

According to the information of the M CORESETs configured by the base station or the information of the M SSs configured by the base station and the rules of the repetitive DCI indicated by the base station, the UE determines the time-frequency resource position of the blindly-demodulated DCI, the number of the DCI requiring blind demodulation and the time-frequency resource position of the repetitive DCI.

The UE determines the type of the final scheduled resource and the number of the final scheduled resources according to the number of the PDSCH resources that can be scheduled by the repetitive DCI configured by the base station and the detection condition of the repetitive DCI after blind demodulation.

The UE determines the final RV of the repetitive DCI according to the remapping rule of the redundancy version (RV) of the repetitive DCI configured by the base station and the detection condition of the repetitive DCI after blind demodulation.

The UE determines that 2 pieces of repetitive DCI are located in different slots and schedule 2 different PDSCHs according to the final blind demodulation result of the configuration of the base station and determines the RV in the repetitive DCI according to the remapping rule of the RV configured by the base station.

Figure 12:
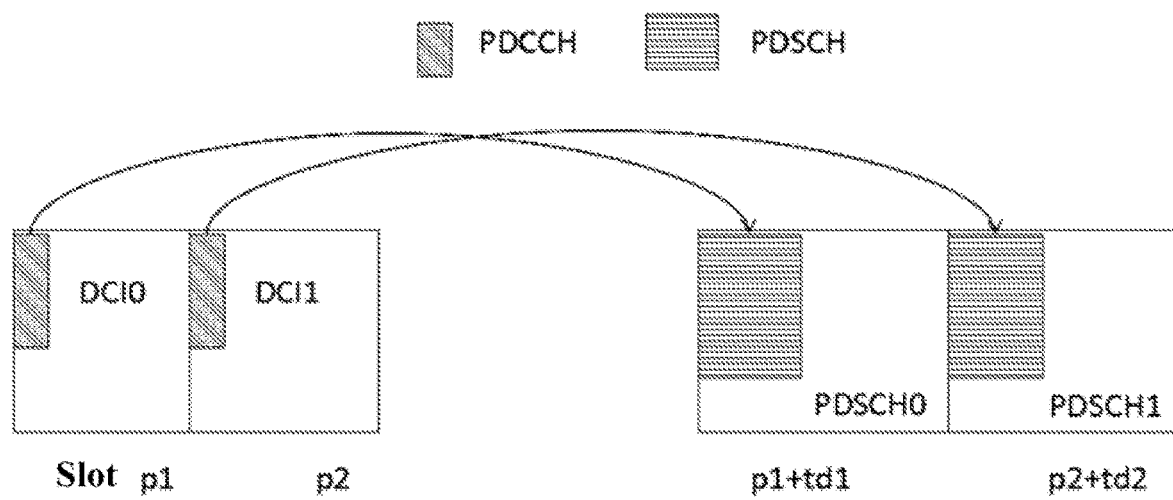
FIG. 12 is a diagram of a structure in which repetitive DCI schedules PDSCHs in different slots according to the present application.

FIG. 12 is a diagram of a structure in which repetitive DCI schedules multiple PDSCHs in different slots according to the present application. As shown in FIG. 12, DCI0, DCI1, PDSCH0 and PDSCH1 are located in slot p1, slot p2, slot p1+td1 and slot p2+td2 respectively, where p2>p1>0, (p2+td2)>(p1+td1), and DCI0 and DCI1 schedule the PDSCH0 and the PDSCH1 respectively.

Although DCI1 and DCI0 carry the same content, DCI1 and DCI0 are demodulated in different slots. Although the RVs are the same, the UE may have different understandings and may use different rules to remap the RVs. For example, the base station configures that performing a modulo-4 operation on an accumulation count of the demodulated sequential (starting from 1) of the repetitive DCI and taking the result as the catalog index for remapping the RV, and sequential mapping to corresponding elements in the RV remapping sequence is performed according to the catalog index. The RV remapping sequence may be {0, 3, 2, 1} or {0, 2, 3, 1} or {0, 1, 2, 3}. This embodiment of the present application has two pieces of repetitive DCI. If the two pieces of repetitive DCI are mapped according to {0, 3, 2, 1}, then the RV in DCI0 is 0, and the RV in DCI1 is 3; if the two pieces of repetitive DCI are mapped according to {0, 2, 3, 1}, then the RV in DCI0 is 0, and the RV in DCI1 is 2; and if the two pieces of repetitive DCI are mapped according to {0, 1, 2, 3}, then the RV in DCI0 is 0, and the RV in DCI1 is 1.

In an embodiment, the base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can schedule multiple PUSCHs in different slots.

The base station configures that the repetitive DCI schedules the PUSCHs in the different slots and configures the remapping rule of the RV of the repetitive DCI.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI.

The UE determines the type of the final scheduled resource and the number of the final scheduled resources according to the number of the PDSCH/PUSCH/AP SRS resources that can be scheduled by the repetitive DCI configured by the base station and the detection condition of the repetitive DCI after blind demodulation.

The UE determines the final RV of the repetitive DCI according to the remapping rule of the redundancy version (RV) of the repetitive DCI configured by the base station and the detection condition of the repetitive DCI after blind demodulation.

The UE determines that 2 pieces of repetitive DCI are located in different slots and schedule 2 different PUSCHs according to the final blind demodulation result of the configuration of the base station and determines the RV in the repetitive DCI according to the remapping rule of the RV configured by the base station.

Figure 13:
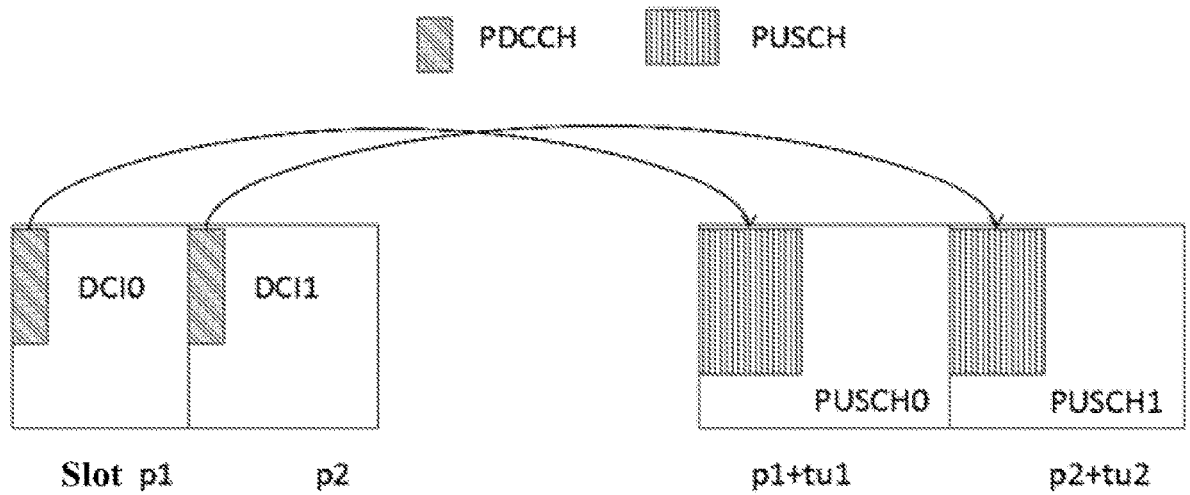
FIG. 13 is a diagram of a structure in which repetitive DCI schedules PUSCHs in different slots according to the present application.

FIG. 13 is a diagram of a structure in which repetitive DCI schedules multiple PUSCHs in different slots according to the present application. As shown in FIG. 13, DCI0, DCI1, PUSCH0 and PUSCH1 are located in slot p1, slot p2, slot p1+tu1 and slot p2+tu2 respectively, where p2>p1>0, (p2+tu2)>(p1+tu1), and DCI0 and DCI1 schedule the PUSCH0 and the PUSCH1 respectively.

Although DCI1 and DCI0 carry the same content, DCI1 and DCI0 are demodulated in different slots. Although the RVs are the same, the UE may have different understandings and may use different rules to remap the RVs. For example, the base station configures that performing a modulo-4 operation on an accumulation count of the demodulated sequential (starting from 1) of the repetitive DCI and taking the result as the catalog index for remapping the RV, and sequential mapping to corresponding elements in the RV remapping sequence is performed according to the catalog index. The RV remapping sequence may be {0, 3, 2, 1} or {0, 2, 3, 1} or {0, 1, 2, 3}. This embodiment of the present application has two pieces of repetitive DCI. If the two pieces of repetitive DCI are mapped according to {0, 3, 2, 1}, then the RV in DCI0 is 0, and the RV in DCI1 is 3; if the two pieces of repetitive DCI are mapped according to {0, 2, 3, 1}, then the RV in DCI0 is 0, and the RV in DCI1 is 2; and if the two pieces of repetitive DCI are mapped according to {0, 1, 2, 3}, then the RV in DCI0 is 0, and the RV in of DCI1 is 1.

Figure 14:
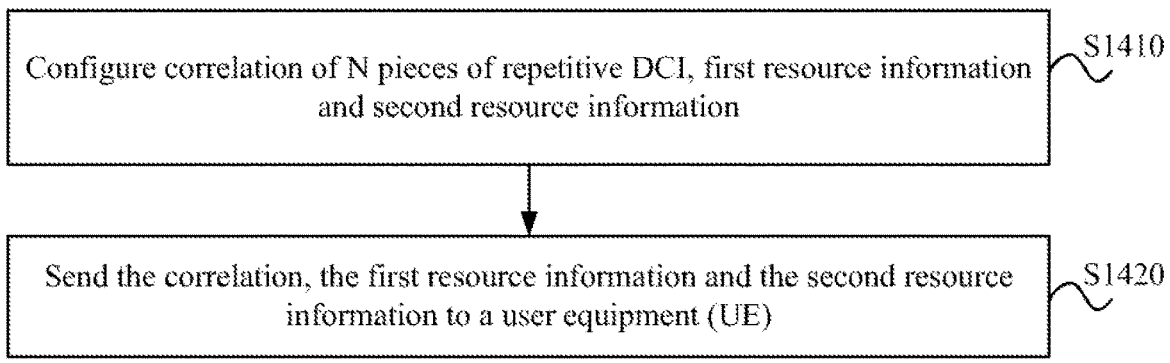
FIG. 14 is a flowchart of an information enhancement method according to the present application.

In an embodiment, FIG. 14 is a flowchart of an information enhancement method according to the present application. The method may be applied to the cases of the PDCCH repetitive transmission in the multi-TRP/panel scenarios. This method may be executed by an information enhancement apparatus provided by the present application. The information enhancement apparatus may be implemented by software and/or hardware and integrated on the user equipment (UE).

As shown in FIG. 14, the information enhancement method provided by this embodiment of the present application mainly includes S1410 and S1420.

In S1410, correlation of the N pieces of repetitive DCI, first resource information of the N pieces of repetitive DCI and second resource information of the N pieces of repetitive DCI are configured.

The correlation is used for determining the repetitive DCI. The DCI set includes the M pieces of DCI. The M pieces of DCI include the N pieces of repetitive DCI and the M-N pieces of nonrepetitive DCI. The DCI set includes the first DCI subset and the second DCI subset. The first DCI subset includes the N pieces of repetitive DCI, and the second DCI subset includes the M-N pieces of nonrepetitive DCI. M and N are each a positive integer, and M>N>1.

In an embodiment, configuring the correlation of the N pieces of repetitive DCI includes at least one of the following:

Each piece of repetitive DCI is added with an SSREF domain in the search space (SS), where the content in the SSREF domain is not the search space identifier (SSID) of the current DCI;

Each piece of repetitive DCI is added with a CORESETREF domain on the control resource set (CORESET), where the content in the CORESETREF domain is not the control resource set identifier (CORESETID) of the current DCI;

A predefined high layer repetitive signaling rule applies, where the repetitive signaling rule includes at least one of the following: Each piece of repetitive DCI is configured with the same first information element in the SS, where the first information element includes at least one of the following: the first duration, the monitoring slot period, the monitoring slot period offset, the number of the candidate PDDCHs, the DCI format or the position of the symbol inside the monitoring slot; or each piece of repetitive DCI is configured with the same second information element on the CORESET, where the second information element includes at least one of the following: the second duration, the type of the mapping of the control channel element to the resource element group, the frequency domain resource, the interleaving size, the scrambling ID of the DMRS of the PDCCH, the precoding granularity, the transmission control information set, the shift catalog or the number of the resource group bindings.

In this embodiment, any one or a combination of more of the following manners may be used for configuring the correlation for the repetitive DCI.

In a first manner, each piece of repetitive DCI is added with an SSREF domain in the search space (SS). The base station only configures the correlation for the SS in which 2 pieces of repetitive DCI are located and does not configure the correlation for the SS in which another 2 pieces of nonrepetitive DCI are located.

If the DCI on the first SS and the DCI on the second SS are repetitive, and the ID corresponding to the first SS is SSID1, and the ID corresponding to the second SS is SSID2, then an SSREF domain is added on the first SS, and the content in the SSREF domain is SSID2; and an SSREF domain is added on the second SS, and the content in the SSREF domain is SSID1.

In a second manner, each piece of repetitive DCI is added with a CORESETREF domain on the control resource set (CORESET), where the content in the CORESETREF domain is not the CORESETID of the current DCI. The base station only configures the correlation for the CORESET in which 2 pieces of repetitive DCI are located and does not configure the correlation for the CORESET in which another 2 pieces of nonrepetitive DCI are located.

If the DCI on the first CORESET and the DCI on the second CORESET are repetitive, and the ID corresponding to the first CORESET is CORESETID1, and the ID corresponding to the second CORESET is CORESETID2, then a CORESETREF domain is added on the first CORESET, and the content in the CORESETREF domain is CORESETID2; and a CORESETREF domain is added on the second CORESET, and the content in the CORESETREF domain is CORESETID1.

In a third manner, the high layer repetitive signaling rule is configured.

Configuring the repetitive signaling rule includes at least one of the following: The same one or more first information elements are configured for the 2 pieces of repetitive DCI in the SS; a different one or more first information elements are configured for the 2 pieces of nonrepetitive DCI in the SS; the same one or more second information elements are configured for the 2 pieces of repetitive DCI on the CORESET; or a different one or more second information elements are configured for the 2 pieces of nonrepetitive DCI on the CORESET.

The first information element may include at least of the following: the first duration, the monitoring slot period, the monitoring slot period offset, the number of the candidate PDCCHs, the DCI format and the position of the symbol within the monitoring slot. The second information element may include at least of the following: the second duration, the type of the mapping of the control channel element to the resource element group, the frequency domain resource, the interleaving size, the scrambling ID of the DMRS of the PDCCH, the precoding granularity, the transmission control information set, the shift catalog or the number of the resource group bindings.

For example, the search space (SS) is configured with the same first duration, the same monitoring slot period, the same monitoring slot period offset, the same number of the candidate PDCCHs, the same DCI format and the same position of the symbol inside the monitoring slot.

For example, the control resource set (CORESET) is configured with the same second duration, the same type of the mapping of the control channel element to the resource element group, the same frequency domain resource, the same interleaving size, the same scrambling ID of the DMRS of the PDCCH, the same precoding granularity, the same transmission control information set, the same shift catalog or the same number of the resource group bindings.

In an embodiment, the first resource information includes the type of the resource scheduled by the repetitive DCI, the number of the resources scheduled by the repetitive DCI and the reference DCI of the resource scheduled by the repetitive DCI, where the type of the resource includes at least one of the following: the physical downlink shared channel (PDSCH), the physical uplink shared channel (PUSCH) or the aperiodic sounding reference signal (AP SRS).

Configuring the first resource information may include, but is not limited to, at least one of the following.

The base station indicates to the UE that the repetitive DCI can only schedule one PDSCH in the same slot; the base station indicates to the UE that the repetitive DCI can only schedule one PUSCH in the same slot; the base station indicates to the UE that the repetitive DCI can only schedule one AP SRS in the same slot; the base station indicates to the UE that the repetitive DCI can schedule multiple PDSCHs in the same slot; the base station indicates to the UE that the repetitive DCI can schedule multiple PUSCHs in the same slot; the base station indicates to the UE that the repetitive DCI can schedule multiple AP SRSs in the same slot; the UE determines the number of the PDSCHs according to its capability in response to the base station not limiting the number of the PDSCHs that the repetitive DCI can schedule in the same slot; the UE determines the number of the PUSCHs according to its capability in response to the base station not limiting the number of the PUSCHs that the repetitive DCI can schedule in the same slot; the UE determines the number of the AP SRSs according to its capability in response to the base station not limiting the number of the AP SRSs that the repetitive DCI can schedule in the same slot; the base station indicates to the UE that the repetitive DCI can only schedule one PDSCH in different slots; the base station indicates to the UE that the repetitive DCI can only schedule one PUSCH in different slots; the base station indicates to the UE that the repetitive DCI can only schedule one AP SRS in different slots; the base station indicates to the UE that the repetitive DCI can schedule multiple PDSCHs in different slots; the base station indicates to the UE that the repetitive DCI can schedule multiple PUSCHs in different slots; the base station indicates to the UE that the repetitive DCI can schedule multiple AP SRSs in different slots; the UE determines the number of the PDSCHs according to its capability in response to the base station not limiting the number of the PDSCHs that the repetitive DCI can schedule in different slots; the UE determines the number of the PUSCHs according to its capability in response to the base station not limiting the number of the PUSCHs that the repetitive DCI can schedule in different slots; or the UE determines the number of the AP SRSs according to its capability in response to the base station not limiting the number of the AP SRSs that the repetitive DCI can schedule in different slots.

The base station indicates to the UE that the repetitive DCI is located in different transmission slots and schedules a reference slot correlated to the same resource.

In an embodiment, the reference DCI includes at least one of the following: the DCI having the minimum transmission slot among the N pieces of repetitive DCI; the DCI having the maximum transmission slot among the N pieces of repetitive DCI; the DCI corresponding to the minimum control resource set identifier among the N pieces of repetitive DCI; the DCI corresponding to the maximum control resource set identifier among the N pieces of repetitive DCI;

the DCI corresponding to the minimum search space identifier among the N pieces of repetitive DCI; or the DCI corresponding to the maximum search space identifier among the N pieces of repetitive DCI.

When the base station configures that the repetitive DCI is located in different slots and schedule the same PDSCH, determining the transmission slot of the PDSCH includes, but is not limited to, one of the following manners.

The DCI having the minimum transmission slot determines the position of the PDSCH; the DCI having the maximum transmission slot determines the position of the PDSCH; the DCI in which the minimum control resource set identifier is located determines the position of the PDSCH; the DCI in which the maximum control resource set identifier is located determines the position of the PDSCH; the DCI in which the minimum search space identifier is located determines the position of the PDSCH; or the DCI in which the maximum search space identifier is located determines the position of the PDSCH.

When the base station configures that the repetitive DCI is located in different slots and schedules the same PDSCH, and the spatial correlation parameter is determined, the time interval between the DCI and the scheduled PDSCH needs to be compared with the value of a capability parameter of the UE.

The time interval between the DCI and the scheduled PDSCH includes, but is not limited to, one of the following manners.

the time interval between the DCI having the minimum transmission slot and the PDSCH; the time interval between the DCI having the maximum transmission slot and the PDSCH; the time interval between the DCI in which the minimum control resource set identifier is located and the PDSCH; the time interval between the DCI in which the maximum control resource set identifier is located and the PDSCH; the time interval between the DCI in which the minimum search space identifier is located and the PDSCH; or the time interval between the DCI in which the maximum search space identifier is located and the PDSCH.

When the base station configures that the repetitive DCI is located in different slots and schedules the same PUSCH, determining the transmission slot of the PUSCH includes, but is not limited to, one of the following manners.

The DCI having the minimum transmission slot determines the position of the PUSCH; the DCI having the maximum transmission slot determines the position of the PUSCH; the DCI in which the minimum control resource set identifier is located determines the position of the PUSCH; the DCI in which the maximum control resource set identifier is located determines the position of the PUSCH; the DCI in which the minimum search space identifier is located determines the position of the PUSCH; or the DCI in which the maximum search space identifier is located determines the position of the PUSCH.

In an embodiment, the second resource information includes the type of the resource scheduled by the repetitive DCI, the number of the resources scheduled by the repetitive DCI and the redundancy version (RV) of the repetitive DCI, where the type of the resource includes at least one of the following: the physical downlink shared channel (PDSCH) or the physical uplink shared channel (PUSCH).

When the base station configures that the repetitive DCI is located in different slots and schedules the same AP SRS, determining the transmission slot of the SRS includes, but is not limited to, one of the following manners.

The DCI having the minimum transmission slot determines the position of the SRS; the DCI having the maximum transmission slot determines the position of the SRS; the DCI in which the minimum control resource set identifier is located determines the position of the SRS; the DCI in which the maximum control resource set identifier is located determines the position of the SRS; the DCI in which the minimum search space identifier is located determines the position of the SRS; or the DCI in which the maximum search space identifier is located determines the position of the SRS.

In an embodiment, when the repetitive DCI is located in different slots and schedules multiple resources, the redundancy version (RV) of the repetitive DCI is configured.

That the repetitive DCI is located in different slots and schedules multiple PDSCHs includes, but is not limited to, the following manners: performing a modulo-4 operation on an accumulation count of the demodulated sequential (starting from 1) of the repetitive DCI and taking the result as the catalog index for remapping the RV, and sequential mapping to corresponding elements in the RV remapping sequence is performed according to the catalog index, where the RV remapping sequence includes, but is not limited to, $\{0, 3, 2, 1\}$, $\{0, 2, 3, 1\}$ and $\{0, 1, 2, 3\}$.

That the repetitive DCI is located in different slots and schedules multiple PUSCHs includes, but is not limited to, the following manners: performing a modulo-4 operation on an accumulation count of the demodulated sequential (starting from 1) of the repetitive DCI and taking the result as the catalog index for remapping the RV, and sequential mapping to corresponding elements in the RV remapping sequence is performed according to the catalog index, where the RV remapping sequence includes, but is not limited to, $\{0, 3, 2, 1\}$, $\{0, 2, 3, 1\}$ and $\{0, 1, 2, 3\}$.

In S1420, the correlation, the first resource information and the second resource information are sent to the user equipment (UE).

To enable the UE to determine the repetitive DCI according to the correlation, the configured correlation needs to be sent to the UE.

In an embodiment, the UE does not detect the repetitive DCI and the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can only schedule one PDSCH in different slots.

According to the correlation of the M CORESETs configured by the base station or the correlation of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI.

The UE determines the type of the final scheduled resource and the number of the final scheduled resources according to the number of the PDSCH resources that can be scheduled by the repetitive DCI configured by the base station and the detection condition of the repetitive DCI after blind demodulation.

The repetitive DCI is undetected. In the preceding embodiment, 1 in the solid box position of FIG. 5 and 1 in the dashed box position of FIG. 5 are undetected, so the UE calculates the value of the DAI according to the sequence of the DCI actually detected and does not reserve the value of the DAI according to the value of the DAI in the DCI. That is, the final DAI value is 123 instead of 234.

In an embodiment, the UE detects that the repetitive DCI is located in the same slot and schedules only one PDSCH and detects the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can only schedule one PDSCH in the same slot.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI. The specific configuration manner can be described with reference to the manner of configuring information for the repetitive DCI by the base station provided in the preceding embodiment and thereby is not repeated here.

The UE determines the type of the final scheduled resource and the number of the final scheduled resources according to the number of the PDSCH/PUSCH/AP SRS resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in the same slot and schedule the same PDSCH.

The manner of determining the transmission slot of the PDSCH by the UE can be described with reference to the manner of determining the transmission slot of the PUSCH provided in the preceding embodiment and thereby is not repeated in this embodiment.

The case in which the UE detects at least one piece of repetitive DCI can be described with reference to the manner of solving the DAI misalignment by at least one piece of repetitive DCI detected provided in the preceding embodiment and thereby is not repeated in this embodiment.

In an embodiment, the UE detects that the repetitive DCI is located in the same slot and schedules only one PUSCH and detects the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI can only schedule one PUSCH in the same slot.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI. The specific configuration manner can be described with reference to the manner of configuring information for the repetitive DCI by the base station provided in the preceding embodiment and thereby is not repeated here.

The UE determines the type of the final scheduled resource and the number of the final scheduled resources according to the number of the PDSCH/PUSCH/AP SRS resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in the same slot and schedule the same PUSCH.

The case in which the UE detects at least one piece of repetitive DCI can be described with reference to the manner of solving the DAI misalignment by at least one piece of repetitive DCI detected provided in the preceding embodiment and thereby is not repeated in this embodiment.

The manner of determining the transmission slot of the PUSCH by the UE can be described with reference to the manner of determining the transmission slot of the PUSCH provided in the preceding embodiment and thereby is not repeated in this embodiment.

In an embodiment, the UE detects that the repetitive DCI is located in different slots and schedules only one PDSCH and detects the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI is located in different slots and schedules one PDSCH, and the DCI having the minimum transmission slot determines the position of the PDSCH.

The base station configures that the repetitive DCI is located in different slots and schedules one AP SRS, and the DCI having the minimum transmission slot determines the position of the SRS.

The base station configures that the repetitive DCI is located in different slots and schedules one PDSCH, and when a default beam is determined, the time interval between the DCI and the PDSCH is the time interval between the DCI having the maximum transmission slot and the scheduled PDSCH. The specific configuration manner can be described with reference to the manner of configuring the correlation for the repetitive DCI by the base station provided in the preceding embodiment and thereby is not repeated here.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI.

The UE determines the type of the final scheduled resource and the number of the final scheduled resources according to the number of the AP SRS resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule the same PDSCH.

The repetitive DCI is located in different slots and schedules only one PDSCH, so a slot offset problem exists between the repetitive DCI having a rear transmission slot and the scheduled PDSCH, the repetitive DCI having a front transmission slot determines the spatial correlation parameter, a slot offset problem exists between the DCI and the PDSCH, and a slot offset problem exists between the repetitive DCI having the rear transmission slot and the triggered AP SRS. With reference to the solution to the slot offset problem provided in the preceding embodiment, this is not repeated in this embodiment.

The repetitive DCI having the rear transmission slot refers to the repetitive DCI having the non-minimum transmission slot, that is, all the repetitive DCI except for the repetitive DCI having the minimum transmission slot. The repetitive DCI having the front transmission slot refers to the repetitive DCI having the non-maximum transmission slot, that is, all the repetitive DCI except for the repetitive DCI having the maximum transmission slot.

The case in which the UE detects at least one piece of repetitive DCI can be described with reference to the manner of solving the DAI misalignment by at least one piece of repetitive DCI detected provided in the preceding embodiment and thereby is not repeated in this embodiment.

In an embodiment, the UE detects that the repetitive DCI is located in different slots and schedules only one PUSCH and detects the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2.

The base station configures that the repetitive DCI is located in different slots and schedules one PUSCH, and the DCI having the minimum transmission slot determines the position of the PUSCH.

The base station configures that the repetitive DCI is located in different slots and schedules one AP SRS, and the DCI having the minimum transmission slot determines the position of the SRS. The specific configuration manner can be described with reference to the manner of configuring the correlation for the repetitive DCI by the base station provided in the preceding embodiment and thereby is not repeated here.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI.

The UE determines the type of the final scheduled resource and the number of the final scheduled resources according to the number of the PDSCH/PUSCH/AP SRS resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule the same PUSCH.

The repetitive DCI is located in different slots and schedules only one PUSCH, so a slot offset problem exists between the repetitive DCI having a rear transmission slot and the scheduled PUSCH and between the repetitive DCI having the rear transmission slot and the triggered AP SRS. With reference to the solution to the slot offset problem provided in the preceding embodiment, this is not repeated in this embodiment.

The case in which the UE detects at least one piece of repetitive DCI can be described with reference to the manner of solving the DAI misalignment by at least one piece of repetitive DCI detected provided in the preceding embodiment and thereby is not repeated in this embodiment.

In an embodiment, the UE detects that the repetitive DCI is located in different slots and schedules multiple PDSCHs and detects the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2. The specific configuration manner can be described with reference to the manner of configuring the correlation for the repetitive DCI by the base station provided in the preceding embodiment and thereby is not repeated here.

The base station configures that the repetitive DCI is located in different slots and multiple schedules PDSCHs.

The base station configures that the repetitive DCI can schedule the multiple PDSCHs in the different slots.

The base station configures the remapping rule of the redundancy version (RV) of the repetitive DCI.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI.

The UE determines the type of the final scheduled resource and the number of the final scheduled resources according to the number of the PDSCH resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule 2 different PDSCHs.

The repetitive DCI is located in different slots and schedules different PUSCHs, so the final RV of the repetitive DCI is determined according to the remapping rule of the redundancy version (RV) of the repetitive DCI configured by the base station and the detection condition of the repetitive DCI after blind demodulation. With reference to the preceding embodiment, this is not repeated in this embodiment.

The case in which the UE detects at least one piece of repetitive DCI can be described with reference to the manner of solving the DAI misalignment by at least one piece of repetitive DCI detected provided in the preceding embodiment and thereby is not repeated in this embodiment.

In an embodiment, the UE detects that the repetitive DCI is located in different slots and schedules multiple PUSCHs and detects the correlated operations between the base station and the UE.

The base station configures M CORESETs or M SSs for the UE and indicates to the UE that the DCI on N CORESETs is repetitive or the DCI on N SSs is repetitive, where M and N are positive integers, and M>N>1, for example, M=4, and N=2. The base station configures that the repetitive DCI can schedule multiple PUSCHs in different slots.

The base station configures the remapping rule of the redundancy version (RV) of the repetitive DCI. The specific configuration manner can be described with reference to the manner of configuring the correlation for the repetitive DCI by the base station provided in the preceding embodiment and thereby is not repeated here.

According to the information of the M CORESETs configured by the base station or the information of the M SSs configured by the base station and the rules of the repetitive DCI indicated by the base station, the UE determines which time-frequency resource positions to blindly demodulate the DCI, the number of the DCI requiring blind demodulation and the time-frequency resource position of the repetitive DCI.

The UE determines the type of the final scheduled resource and the number of the final scheduled resources according to the number of the PUSCH resources that can be scheduled by the repetitive DCI configured by the base station and the detection condition of the repetitive DCI after blind demodulation.

According to the final blind demodulation result of the configuration of the base station, the UE determines that 2 pieces of repetitive DCI are located in different slots and schedule 2 different PUSCHs.

The case in which the UE detects at least one piece of repetitive DCI can be described with reference to the manner of solving the DAI misalignment by at least one piece of repetitive DCI detected provided in the preceding embodiment and thereby is not repeated in this embodiment.

The repetitive DCI is located in different slots and schedules different PUSCHs, so the final RV of the repetitive DCI is determined according to the remapping rule of the redundancy version (RV) of the repetitive DCI configured by the base station and the detection condition of the repetitive DCI after blind demodulation. With reference to the preceding embodiment, this is not repeated in this embodiment.

The case in which the UE detects at least one piece of repetitive DCI can be described with reference to the manner of solving the DAI misalignment by at least one piece of repetitive DCI detected provided in the preceding embodiment and thereby is not repeated in this embodiment.

Figure 15:
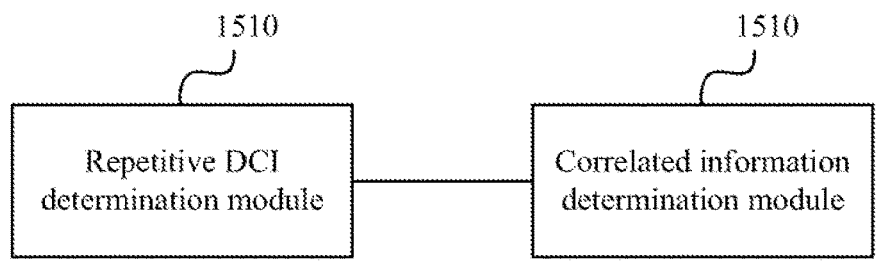
FIG. 15 is a diagram illustrating the structure of an information enhancement apparatus according to the present application.

Embodiments of the present application further provide an information enhancement apparatus. FIG. 15 is a diagram illustrating the structure of an information enhancement apparatus according to the present application. The apparatus may be applied to the cases of the PDCCH repetitive transmission in the multi-TRP/panel scenarios. The information enhancement apparatus may be implemented by software and/or hardware and integrated on the user equipment (UE).

As shown in FIG. 15, the information enhancement apparatus provided by this embodiment of the present application mainly includes modules 1510 and 1520.

A repetitive DCI determination module 1510 is configured to determine the first DCI subset in the downlink control information (DCI) set and the second DCI subset in the DCI set, where the first DCI subset includes the N pieces of repetitive DCI, the second DCI subset includes the M-N pieces of nonrepetitive DCI, N is an integer greater than 1, and M is an integer greater than N. A correlated information determination module 1520 is configured to determine the correlated information about the DCI in the DCI set according to the repetitive DCI.

The information enhancement apparatus provided by this embodiment is applied to the information enhancement method of the embodiments of the present application. The information enhancement apparatus provided by this embodiment has similar implementation principles and technical effects to the information enhancement method of the embodiments of the present application, which is not repeated here.

In an embodiment, the correlated information determination module 1520 is configured to determine the correlated information about the DCI in the DCI set using one of the following manners.

The value of the downlink assignment index (DAI) of the DCI set is determined according to the repetitive DCI; the transmission slot of the resource scheduled by the repetitive DCI is determined according to the repetitive DCI; the redundancy version (RV) of the repetitive DCI is determined according to the repetitive DCI; the value of the DAI of the DCI set and the transmission slot of the resource scheduled by the repetitive DCI are determined according to the repetitive DCI; or the value of the downlink assignment index (DAI) of the DCI set and the redundancy version (RV) of the repetitive DCI are determined according to the repetitive DCI.

In an embodiment, the DCI set includes the M pieces of DCI, where the M pieces of DCI includes the N pieces of repetitive DCI and the M-N pieces of nonrepetitive DCI, the first DCI subset includes the N pieces of repetitive DCI, where M is an integer greater than N.

In an embodiment, the repetitive DCI determination module 1510 is configured to determine the repetitive DCI using at least one of the following:

N pieces of DCI satisfying the high layer repetitive signaling rule in the DCI set are determined as the repetitive DCI; N pieces of DCI having the search space reference (SSREF) domain in the search space (SS) in the DCI set are determined as the repetitive DCI; or N pieces of DCI having the control resource reference (CORESETREF) domain on the control resource set (CORESET) in the DCI set are determined as the repetitive DCI; where each of the all domains included in the N pieces of DCI have the same content.

In an embodiment, the correlated information determination module 1520 is configured to determine the value of the DAI of the DCI set according to the detection result of the N pieces of repetitive DCI in the first DCI subset, where the DAI of the repetitive DCI in the first DCI subset has the same value.

In an embodiment, the correlated information determination module 1520 is configured to, if any of the repetitive DCI in the first DCI subset is undetected, determine the value of the DAI of the DCI set according to the sequence of the DCI actually detected.

In an embodiment, the correlated information determination module 1520 is configured to, if at least one piece of repetitive DCI in the first DCI subset is detected, determine the DCI having the minimum time domain occasion index and the minimum component carrier index in the first DCI subset as the target DCI, place the DAI in the first DCI subset in the position of the target DCI, and then determine the value of the DAI of the DCI set according to the DAI of the target DCI and the DAI of the nonrepetitive DCI in the DCI set, where the position of the DAI is codetermined by the time domain occasion index and the component carrier index.

In an embodiment, the N pieces of repetitive DCI are transmitted in N different transmission slots, and the repetitive DCI schedules the same resource.

In an embodiment, the correlated information determination module 1520 is configured to determine, according to the reference DCI of the N pieces of repetitive DCI, the transmission slot of the resource scheduled by the repetitive DCI, where the reference DCI includes at least one of the following: the DCI having the minimum transmission slot among the N pieces of repetitive DCI; the DCI having the maximum transmission slot among the N pieces of repetitive DCI; the DCI corresponding to the minimum control resource set identifier among the N pieces of repetitive DCI; the DCI corresponding to the maximum control resource set identifier among the N pieces of repetitive DCI; the DCI corresponding to the minimum search space identifier among the N pieces of repetitive DCI; or the DCI corresponding to the maximum search space identifier among the N pieces of repetitive DCI.

In an embodiment, the correlated information determination module 1520 is configured to, when the resource scheduled by the repetitive DCI is the physical downlink shared channel (PDSCH), determine the transmission slot TD of the PDSCH by the transmission slot n1 of the first reference DCI, the carrier spacing parameter μPDSCH of the PDSCH, K0 and the carrier spacing parameter μPDCCH of the physical downlink control channel corresponding to the DCI, where K0 denotes the transmission slot bias between the reference DCI and the PDSCH, and the first reference DCI is any DCI in the reference DCI.

In an embodiment, the correlated information determination module 1520 is configured to determine the time interval between the repetitive DCI and the scheduled PDSCH according to the difference between the transmission slot of the PDSCH and the transmission slot n2 of the second reference DCI; and determine the spatial correlation parameter of the PDSCH according to the time interval, where the second reference DCI is any DCI other than the first reference DCI in the reference DCI.

In an embodiment, the correlated information determination module 1520 is configured to, when the resource scheduled by the repetitive DCI is the PUSCH, determine the transmission slot TU of the PUSCH by the transmission slot n1 of the reference DCI, the carrier spacing parameter μPUSCH of the PUSCH, K1 and the carrier spacing parameter μPDCCH of the physical downlink control channel corresponding to the DCI, where K1 denotes the transmission slot bias between the reference DCI and the PUSCH.

In an embodiment, the correlated information determination module 1520 is configured to, when the resource scheduled by the repetitive DCI is the AP SRS, determine the transmission slot TA of the AP SRS by the transmission slot n1 of the reference DCI, the carrier spacing parameter μSRS of the AP SRS, k and the carrier spacing parameter μPDCCH of the physical downlink control channel corresponding to the DCI, where k denotes the transmission slot bias between the reference DCI and the AP SRS and is determined by the slot offset parameter in the SRS resource set in the higher-layer signaling.

In an embodiment, the apparatus further includes a receive module. The receive module is configured to receive the configured first resource information. The first resource information includes the type of the resource scheduled by the repetitive DCI, the number of the resources scheduled by the repetitive DCI and the reference DCI of the resource scheduled by the repetitive DCI. The type of the resource includes at least one of the following: the physical downlink shared channel (PDSCH), the physical uplink shared channel (PUSCH) or the aperiodic sounding reference signal (AP SRS).

In an embodiment, the N pieces of repetitive DCI are transmitted in N different transmission slots, and the repetitive DCI schedules multiple resources.

In an embodiment, the correlated information determination module 1520 is configured to determine the redundancy version (RV) of the repetitive DCI according to the configured redundancy version (RV) remapping rule and the detection result of the repetitive DCI.

In an embodiment, the receive module is configured to receive the preconfigured second resource information. The second resource information includes the type of the resource scheduled by the repetitive DCI, the number of the resources scheduled by the repetitive DCI and the redundancy version (RV) of the repetitive DCI. The type of the resource includes at least one of the following: the physical downlink shared channel (PDSCH), or the physical uplink shared channel (PUSCH).

In an embodiment, the correlated information determination module 1520 is configured to configure the redundancy version (RV) of the repetitive DCI, and when the N pieces of repetitive DCI schedule N PDSCHs, to remap the redundancy version (RV) of the repetitive DCI according to the predetermined rule.

In an embodiment, the correlated information determination module 1520 is configured to configure the redundancy version (RV) of the repetitive DCI, and when the N pieces of repetitive DCI schedule N PUSCHs, to remap the redundancy version (RV) of the repetitive DCI according to the predetermined rule.

In an embodiment, the apparatus further includes the receive module. The receive module is configured to receive the configured correlation of the N pieces of repetitive DCI. The correlation is used for determining the repetitive DCI.

In an embodiment, the correlation of the N pieces of repetitive DCI includes at least one of the following.

Each piece of repetitive DCI is added with an SSREF domain in the search space (SS), where the content in the SSREF domain is not the search space identifier (SSID) of the current DCI; each piece of repetitive DCI is added with a CORESETREF domain on the control resource set (CORESET), where the content in the CORESETREF domain is not the control resource set identifier (CORESETID) of the current DCI;

A predefined high layer repetitive signaling rule applies, where the repetitive signaling rule includes at least one of the following: Each piece of repetitive DCI is configured with the same first information element in the SS, where the first information element includes at least one of the following: the first duration, the monitoring slot period, the monitoring slot period offset, the number of the candidate PDDCHs, the DCI format or the position of the symbol inside the monitoring slot; or each piece of repetitive DCI is configured with the same second information element on the CORESET, where the second information element includes at least one of the following: the second duration, the type of the mapping of the control channel element to the resource element group, the frequency domain resource, the interleaving size, the scrambling ID of the DMRS of the PDCCH, the precoding granularity, the transmission control information set, the shift catalog or the number of the resource group bindings.

Figure 16:
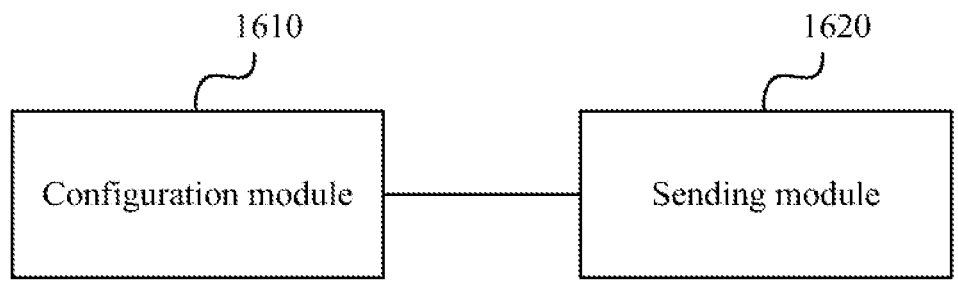
FIG. 16 is a diagram illustrating the structure of an information enhancement apparatus according to the present application.

Embodiments of the present application further provide an information enhancement apparatus. FIG. 16 is a diagram illustrating the structure of an information enhancement apparatus according to the present application. The method may be applied to the cases of the PDCCH repetitive transmission in the multi-TRP/panel scenarios. The information enhancement apparatus may be implemented by software and/or hardware and integrated on the base station.

As shown in FIG. 16, the information enhancement apparatus provided by this embodiment of the present application mainly includes modules 1610 and 1620.

A configuration module 1610 is configured to configure the correlation of the N pieces of repetitive DCI, the first resource information of the N pieces of repetitive DCI and the second resource information of the N pieces of repetitive DCI. A sending module 1620 is configured to send the correlation, the first resource information and the second resource information to the UE.

The information enhancement apparatus provided by this embodiment is applied to the information enhancement method of the embodiments of the present application. The information enhancement apparatus provided by this embodiment has similar implementation principles and technical effects to the information enhancement method of the embodiments of the present application, which is not repeated here.

In an embodiment, the correlation is used for determining the repetitive DCI, and the DCI set includes the M pieces of DCI. The M pieces of DCI include the N pieces of repetitive DCI and the M-N pieces of nonrepetitive DCI. The DCI set includes the first DCI subset and the second DCI subset. The first DCI subset includes the N pieces of repetitive DCI. The second DCI subset includes the M-N pieces of nonrepetitive DCI. M and N are each an integer, and M>N>1.

In an embodiment, the correlation of the N pieces of repetitive DCI includes at least one of the following:

Each piece of repetitive DCI is added with an SSREF domain in the search space (SS), where the content in the SSREF domain is not the search space identifier (SSID) of the current DCI; each piece of repetitive DCI is added with a CORESETREF domain on the control resource set (CORESET), where the content in the CORESETREF domain is not the control resource set identifier (CORESETID) of the current DCI;

The predefined high layer repetitive signaling rule applies, where the repetitive signaling rule includes at least one of the following: Each piece of repetitive DCI is configured with the same first information element in the SS, where the first information element includes at least one of the following: the first duration, the monitoring slot period, the monitoring slot period offset, the number of the candidate PDDCHs, the DCI format or the position of the symbol inside the monitoring slot; or each piece of repetitive DCI is configured with the same second information element on the CORESET, where the second information element includes at least one of the following: the second duration, the type of the mapping of the control channel element to the resource element group, the frequency domain resource, the interleaving size, the scrambling ID of the DMRS of the PDCCH, the precoding granularity, the transmission control information set, the shift catalog or the number of the resource group bindings.

In an embodiment, the first resource information includes the type of the resource scheduled by the repetitive DCI, the number of the resources scheduled by the repetitive DCI and the reference DCI of the resource scheduled by the repetitive DCI, where the type of the resource includes at least one of the following: the physical downlink shared channel (PDSCH), the physical uplink shared channel (PUSCH) or the aperiodic sounding reference signal (AP SRS).

In an embodiment, the configuration module 1610 is configured to configure the reference DCI of the resource scheduled by the repetitive DCI. The reference DCI includes at least one of the following: the DCI having the minimum transmission slot among the N pieces of repetitive DCI; the DCI having the maximum transmission slot among the N pieces of repetitive DCI; the DCI corresponding to the minimum control resource set identifier among the N pieces of repetitive DCI; the DCI corresponding to the maximum control resource set identifier among the N pieces of repetitive DCI; the DCI corresponding to the minimum search space identifier among the N pieces of repetitive DCI; or the DCI corresponding to the maximum search space identifier among the N pieces of repetitive DCI.

In an embodiment, the configuration module 1610 is configured to configure that the reference DCI is the DCI having the minimum transmission slot when the N pieces of repetitive DCI schedule one PDSCH, and the slot position of the PDSCH scheduled by the repetitive DCI is determined.

In an embodiment, the configuration module 1610 is configured to configure that the first reference DCI is the DCI having the minimum transmission slot, and the second reference DCI is the DCI having the maximum transmission slot when the N pieces of repetitive DCI schedule one PDSCH, and the spatial correlation parameter of the PDSCH scheduled by the repetitive DCI is determined.

In an embodiment, the configuration module 1610 is configured to configure that the reference DCI is the DCI having the minimum transmission slot when the N pieces of repetitive DCI schedule one PUSCH, and the slot position of the PUSCH scheduled by the repetitive DCI is determined.

In an embodiment, the configuration module 1610 is configured to configure that the reference DCI is the DCI having the minimum transmission slot when the N pieces of repetitive DCI schedule one AP SRS, and the slot position of the SRS scheduled by the repetitive DCI is determined.

In an embodiment, the second resource information includes the type of the resource scheduled by the repetitive DCI, the number of the resources scheduled by the repetitive DCI and the redundancy version (RV) of the repetitive DCI. The type of the resource includes at least one of the following: the physical downlink shared channel (PDSCH) or the physical uplink shared channel (PUSCH).

In an embodiment, the configuration module 1610 is configured to configure the remapping rule of the redundancy version (RV) in the repetitive DCI when the N pieces of repetitive DCI schedule N PDSCHs.

In an embodiment, the configuration module 1610 is configured to configure the remapping rule of the redundancy version (RV) in the repetitive DCI when the N pieces of repetitive DCI schedule N PUSCHs.

Figure 17:
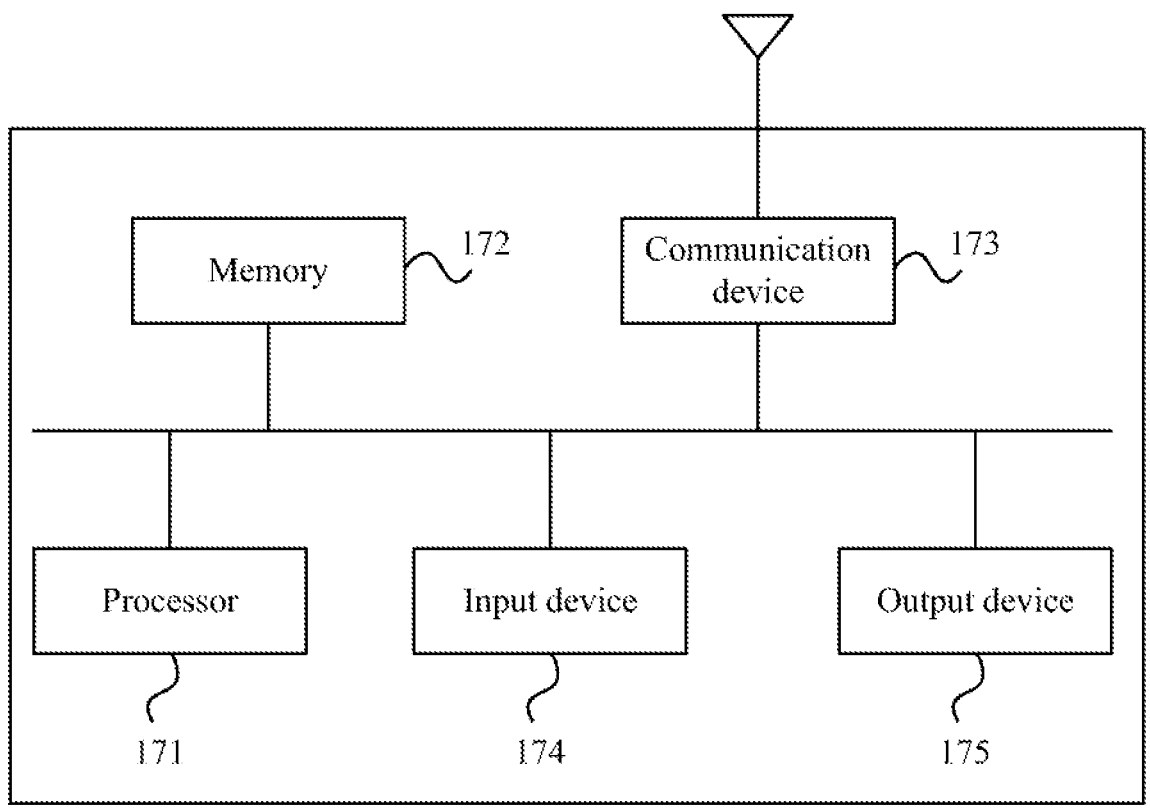
FIG. 17 is a diagram illustrating the structure of a user equipment according to the present application.

Embodiments of the present application further provide a user equipment. FIG. 17 is a diagram illustrating the structure of a user equipment according to the present application. As shown in FIG. 17, the user equipment provided by the present application includes one or more processors 171 and a memory 172. One or more processors 171 may be provided in the user equipment. In FIG. 17, one processor 171 is used as an example. The memory 172 is used for storing one or more programs. When executed by the one or more processors 171, the one or more programs cause the one or more processors 171 to implement the information enhancement method described in embodiments of the present application.

The user equipment further includes a communication device 173, an input device 174, and an output device 175.

The processor 171, the memory 172, the communication device 173, the input device 174 and the output device 175 in the user equipment may be connected via a bus or other means, with connection via a bus as an example in FIG. 17.

The input device 174 may be used for receiving inputted digital or inputted character information and for generating key signal input correlated to user settings of the user equipment and function control of the user equipment. The output device 175 may include display devices such as a display screen.

The communication device 173 may include a receiver and a transmitter. The communication device 173 is configured to perform information receiving-sending communication under the control of the processor 171.

As a computer-readable storage medium, the memory 172 may be configured to store software programs, computer-executable programs and modules, such as program instructions/modules corresponding to the information enhancement method described in the embodiments of the present application (for example, the repetitive DCI determination module 1510 and the correlated information determination module 1520 in the information enhancement apparatus). The memory 172 may include a storage program region and a storage data region, where the storage program region may store an operating system and an application program required by at least one function, and the storage data region may store data created according to the use of the device. Moreover, the memory 172 may include a high-speed random access memory and may further include a nonvolatile memory, such as at least one disk memory, flash memory or other nonvolatile solid-state memories. In some examples, the memory 172 may include memories which are remotely disposed relative to the processor 171, and these remote memories may be connected to the device via a network. Examples of the preceding network include, but are not limited to, the Internet, an intranet, a local area network, a mobile communication network and a combination thereof.

Figure 18:
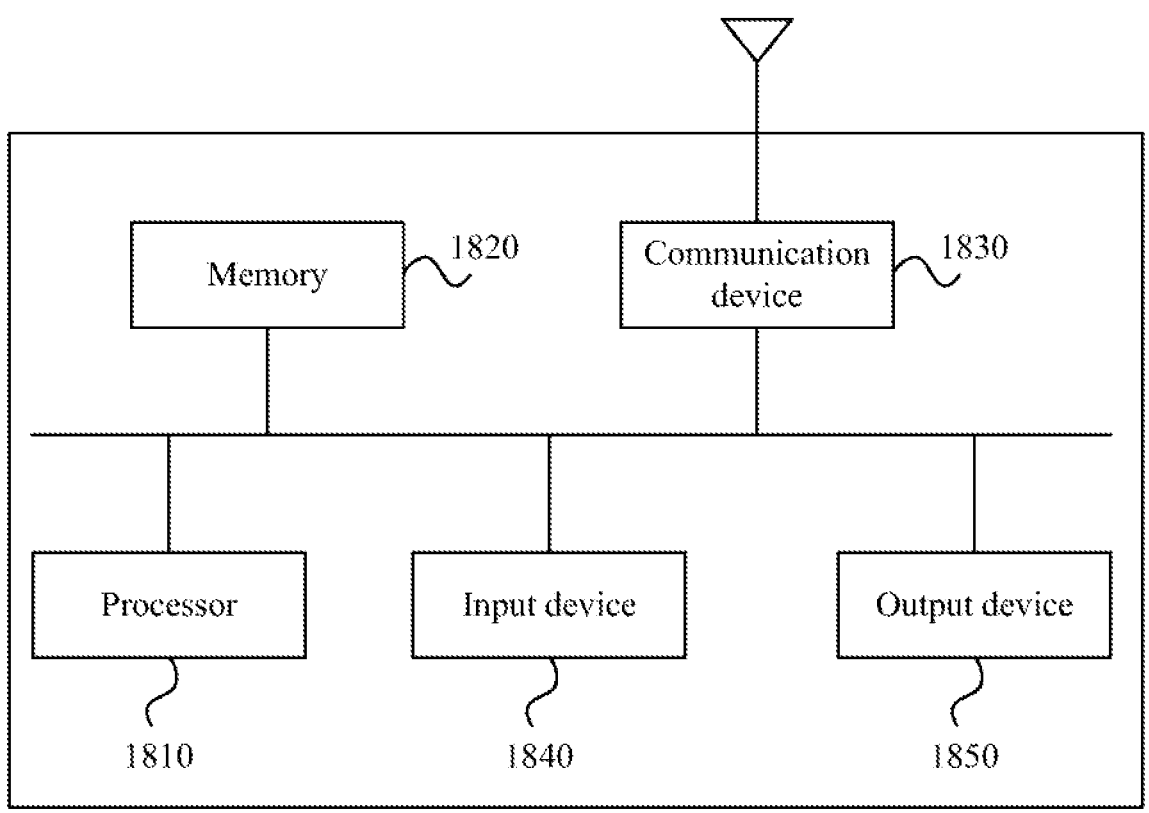
FIG. 18 is a diagram illustrating the structure of a base station according to the present application.

Embodiments of the present application further provide a base station. FIG. 18 is a diagram illustrating the structure of a base station according to the present application. As shown in FIG. 18, the base station provided by the present application includes one or more processors 1810 and a memory 1820. One or more processors 1810 may be provided in the base station. In FIG. 18, one processor 1810 is used as an example. The memory 1820 is used for storing one or more programs. When executed by the one or more processors 1810, the one or more programs cause the one or more processors 1810 to implement the information enhancement method described in embodiments of the present application.

The base station further includes a communication device 1830, an input device 1840 and an output device 1850.

The processor 1810, the memory 1820, the communication device 1830, the input device 1840 and the output device 1850 in the base station may be connected via a bus or other means, with connection via a bus as an example in FIG. 18.

The input device 1840 may be used for receiving inputted digitals or inputted character information and for generating key signal input correlated to user settings of the user equipment and function control of the user equipment. The output device 1850 may include display devices such as a display screen.

The communication device 1830 may include a receiver and a transmitter. The communication device 1830 is configured to perform information receiving-sending communication under the control of the processor 1810.

As a computer-readable storage medium, the memory 1820 may be configured to store software programs, computer-executable programs and modules, such as program instructions/modules corresponding to the information enhancement method described in the embodiments of the present application (for example, the configuration module 1610 and the sending module 1620 in the information enhancement apparatus). The memory 1820 may include a storage program region and a storage data region, where the storage program region may store an operating system and an application program required by at least one function, and the storage data region may store data created according to the use of the device. Moreover, the memory 1820 may include a high-speed random access memory and may further include a nonvolatile memory, such as at least one disk memory, flash memory or other nonvolatile solid-state memories. In some examples, the memory 1820 may include memories which are remotely disposed relative to the processor 1810, and these remote memories may be connected to the base station via a network. Examples of the preceding network include, but are not limited to, the Internet, an intranet, a local area network, a mobile communication network and a combination thereof.

Embodiments of the present application further provide a storage medium storing a computer program. When executed by a processor, the computer program causes the processor to implement the information enhancement method described in any of the embodiments of the present application, for example, the information enhancement method applied to the user equipment and the information enhancement method applied to the base station.

The information enhancement method applied to the user equipment includes the following.

The first DCI subset in the downlink control information (DCI) set and the second DCI subset in the (DCI) set are determined, where the first DCI subset includes the N pieces of repetitive DCI, the second DCI subset includes the M-N pieces of nonrepetitive DCI, N is an integer greater than 1, and M is an integer greater than N; and the correlated information about the DCI in the DCI set is determined according to the repetitive DCI.

The information enhancement method applied to the base station includes the following.

The correlation of the N pieces of repetitive DCI, the first resource information of the N pieces of repetitive DCI and the second resource information of the N pieces of repetitive DCI are configured, and the correlation, the first resource information and the second resource information are sent to the UE.

The preceding are only embodiments of the present application and are not intended to limit the scope of the present application.

The term user terminal encompasses any appropriate type of radio user device, such as a mobile phone, a portable data processing apparatus, a portable web browser or a vehicle-mounted mobile station.

In general, multiple embodiments of the present application may be implemented in hardware, a dedicated circuit, software, logic, or any combination thereof. For example, some aspects may be implemented in hardware while other aspects may be implemented in firmware or software that may be executed by a controller, a microprocessor, or other computing apparatuses, though the present application is not limited thereto.

Embodiments of the present application may be implemented by computer program instructions executed by a data processor of a mobile apparatus, for example, in a processor entity, may be implemented by hardware, or may be implemented by a combination of software and hardware. The computer program instructions may be assembly instructions, instruction set architecture (ISA) instructions, machine instructions, machine-correlated instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. Computer programs may be stored in a memory. The memory may be of any type suitable to the local technical environment and may be implemented using any suitable data storage technology, such as, but not limited to, a read-only memory (ROM), a random-access memory (RAM), an optical memory device and system (a digital video disc (DVD) or a compact disc (CD)), and the like. Computer-readable media may include non-transitory storage media. The data processor may be of any type suitable to the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An information enhancement method, comprising:
   determining a first downlink control information (DCI) subset in a DCI set and a second DCI subset in the DCI set, wherein the first DCI subset comprises N pieces of repetitive DCI, and the second DCI subset comprises M-N pieces of nonrepetitive DCI, N is an integer greater than 1, and M is an integer greater than N; and
   determining correlated information about DCI in the DCI set according to the N pieces of repetitive DCI,
   wherein determining the correlated information about the DCI in the DCI set according to the N pieces of repetitive DCI comprises:
   determining, according to the N pieces of repetitive DCI, a transmission slot of a resource scheduled by a piece of repetitive DCI,
   wherein the N pieces of repetitive DCI are transmitted in N different transmission slots, and the N pieces of repetitive DCI schedule a same resource,
   wherein determining the transmission slot of the resource scheduled by the piece of repetitive DCI according to the N pieces of repetitive DCI comprises:
   determining, according to pieces of reference DCI of the N pieces of repetitive DCI, the transmission slot of the resource scheduled by the piece of repetitive DCI, wherein the reference DCI comprises at least one of the following: a piece of DCI having a minimum transmission slot among the N pieces of repetitive DCI; a piece of DCI having a maximum transmission slot among the N pieces of repetitive DCI; a piece of DCI corresponding to a minimum control resource set identifier among the N pieces of repetitive DCI; a piece of DCI corresponding to a maximum control resource set identifier among the N pieces of repetitive DCI; a piece of DCI corresponding to a minimum search space identifier among the N pieces of repetitive DCI; or a piece of DCI corresponding to a maximum search space identifier among the N pieces of repetitive DCI.

2. The method according to claim 1, wherein the DCI set comprises M pieces of DCI, wherein the M pieces of DCI comprise the N pieces of repetitive DCI and the M-N pieces of nonrepetitive DCI.

3. The method according to claim 1, wherein determining the first DCI subset in the DCI set comprises at least one of the following:
   determining N pieces of DCI satisfying a higher layer repetitive signaling rule in the DCI set each as a piece of repetitive DCI;
   determining N pieces of DCI having a search space reference (SSREF) domain in a search space (SS) in the DCI set each as a piece of repetitive DCI; or
   determining N pieces of DCI having a control resource set reference (CORESETREF) domain in a control resource set (CORESET) in the DCI set each as a piece of repetitive DCI,
   wherein each of all domains comprised in the N pieces of DCI have a same content.

4. The method according to claim 1, wherein determining, according to the pieces of reference DCI of the N pieces of repetitive DCI, the transmission slot of the resource scheduled by the piece of repetitive DCI comprises:
   in a case where the resource scheduled by the piece of repetitive DCI is a physical downlink shared channel (PDSCH), determining a transmission slot TD of the PDSCH by a transmission slot n1 of first reference DCI, a carrier spacing parameter $\mu PDSCH$ of the PDSCH, $K_0$ and a carrier spacing parameter $\mu PDCCH$ of a physical downlink control channel corresponding to a piece of DCI, wherein $K_0$ denotes a transmission slot bias between a piece of reference DCI and the PDSCH, and the first reference DCI is one piece of the pieces of reference DCI,
   determining a time interval between the piece of repetitive DCI and the scheduled PDSCH according to a difference between the transmission slot of the PDSCH and a transmission slot n2 of second reference DCI; and
   determining a spatial correlation parameter of the PDSCH according to the time interval, wherein the second reference DCI is one piece of the pieces of reference DCI other than the first reference DCI.

5. The method according to claim 1, wherein determining, according to the pieces of reference DCI of the N pieces of repetitive DCI, the transmission slot of the resource scheduled by the piece of repetitive DCI comprises:
   in a case where the resource scheduled by the piece of repetitive DCI is a physical uplink shared channel (PUSCH), determining a transmission slot TU of the PUSCH by a transmission slot n1 of a piece of reference DCI, a carrier spacing parameter $\mu PUSCH$ of the PUSCH, $K_1$ and a carrier spacing parameter $\mu PDCCH$ of a physical downlink control channel corresponding to the DCI, wherein $K_1$ denotes a transmission slot bias between the piece of reference DCI and the PUSCH.

6. The method according to claim 1, further comprising:
   receiving preconfigured first resource information, wherein the first resource information comprises types of resources scheduled by a piece of repetitive DCI, a number of resources scheduled by the piece of repetitive DCI, and pieces of reference DCI of the resources scheduled by the piece of repetitive DCI; and the types of the resources comprise at least one of the following: a type of PDSCH, a type of PUSCH or a type of AP SRS.

7. The method according to claim 1, further comprising:
   receiving preconfigured second resource information, wherein the second resource information comprises types of resources scheduled by the piece of repetitive DCI, a number of resources scheduled by the piece of repetitive DCI, and an RV of the piece of repetitive DCI; and the type of the resource comprises at least one of the following: a type of PDSCH or a type of PUSCH.

8. The method according to claim 1, further comprising:
receiving a preconfigured correlation of the N pieces of repetitive DCI, wherein the correlation is used for determining a piece of repetitive DCI,
wherein the correlation of the N pieces of repetitive DCI comprises at least one of the following:
an SSREF domain is added in an SS of each of the N pieces of repetitive DCI, wherein a content in the SSREF domain is not a search space identifier (SSID) of current DCI;
a CORESETREF domain is added in a CORESET of each of the N pieces of repetitive DCI, wherein a content in the CORESETREF domain is not a control resource set identifier (CORESETID) of current DCI; or
a predefined high layer repetitive signaling rule, wherein the repetitive signal rule comprises at least one of the following: a same first information element is configured in the SS, wherein the first information element comprises at least one of the following: a first duration, a monitoring slot period, a monitoring slot period offset, a number of candidate physical downlink control channels (PDDCHs), a DCI format, or a position of a symbol within a monitoring slot; or CORESETs being configured with a same second information element, wherein the second information element comprises at least one of the following: a second duration, a type of a mapping of a control channel element to a resource element group, a frequency domain resource, an interleaving size, a scrambling ID of a demodulation reference signal (DMRS) of a PDCCH, a precoding granularity, a transmission control information set, a shift catalog or a number of resource group bindings.

9. An information enhancement method, comprising:
configuring a correlation of N pieces of repetitive downlink control information (DCI), first resource information and second resource information, wherein N is an integer greater than 1; and
sending the correlation, the first resource information and the second resource information to a user equipment (UE),
wherein the correlation is used for determining a piece of repetitive DCI, and a DCI set comprises M pieces of DCI, wherein the M pieces of DCI comprise the N pieces of repetitive DCI and M-N pieces of nonrepetitive DCI, the DCI set comprises a first DCI subset and a second DCI subset, the first DCI subset comprises the N pieces of repetitive DCI, and the second DCI subset comprises the M-N pieces of nonrepetitive DCI, and wherein M is an integer and greater than N,
wherein the first resource information comprises types of resources scheduled by a piece of repetitive DCI, a number of resources scheduled by the piece of repetitive DCI, and pieces of reference DCI of the resources scheduled by the piece of repetitive DCI; and the type of the resource comprises at least one of the following: a type of physical downlink shared channel, PDSCH, a type of physical uplink shared channel, PUSCH, or a type of aperiodic sounding reference signal, AP SRS,
wherein the method further comprises:
configuring the reference DCI of the resource scheduled by the N pieces of repetitive DCI, wherein the reference DCI comprises at least one of the following: a piece of DCI having a minimum transmission slot among the N pieces of repetitive DCI; a piece of DCI having a maximum transmission slot among the N pieces of repetitive DCI; a piece of DCI corresponding to a minimum control resource set identifier among the N pieces of repetitive DCI; a piece of DCI corresponding to a maximum control resource set identifier among the N pieces of repetitive DCI; a piece of DCI corresponding to a minimum search space identifier among the N pieces of repetitive DCI; or a piece of DCI corresponding to a maximum search space identifier among the N pieces of repetitive DCI.

10. The method according to claim 9, wherein the correlation of the N pieces of repetitive DCI comprises at least one of the following:
a search space reference (SSREF) domain is added in a search space (SS) of each of the N pieces of repetitive DCI, wherein a content in the SSREF domain is not a search space identifier (SSID) of current DCI;
a control resource set reference (CORESETREF) domain is added in a control resource set (CORESET) of each of the N pieces of repetitive DCI, wherein a content in the CORESETREF domain is not a control resource set identifier (CORESETID) of current DCI; or
a predefined high layer repetitive signaling rule, wherein the repetitive signal rule comprises at least one of the following: a same first information element is configured in the SS, wherein the first information element comprises at least one of the following: a first duration, a monitoring slot period, a monitoring slot period offset, a number of candidate physical downlink control channels (PDDCHs), a DCI format, or a position of a symbol within a monitoring slot; or CORESETs being configured with a same second information element, wherein the second information element comprises at least one of the following: a second duration, a type of a mapping of a control channel element to a resource element group, a frequency domain resource, an interleaving size, a scrambling ID of a demodulation reference signal (DMRS) of a PDCCH, a precoding granularity, a transmission control information set, a shift catalog or a number of resource group bindings.

11. The method according to claim 9, wherein the second resource information comprises types of resources scheduled by the peace of repetitive DCI, a number of resources scheduled by the peace of repetitive DCI, and a redundancy version (RV) of the peace of repetitive DCI; and the type of the resource comprises at least one of the following: a type of PDSCH or a type of PUSCH,
wherein configuring the RV of the peace of repetitive DCI comprises:
in a case where the N pieces of repetitive DCI schedule N PDSCHs, configuring a remapping rule of the RV of the peace of repetitive DCI, and
in a case where the N pieces of repetitive DCI schedule N PUSCHs, configuring a remapping rule of the RV of the peace of repetitive DCI.

12. An information enhancement apparatus, comprising:
a processor and a memory storing processor-executable instructions which, when executed by the processor, are configured to perform the information enhancement method of claim 1.

13. An information enhancement apparatus, comprising:
a processor and a memory storing processor-executable instructions which, when executed by the processor, are configured to perform the information enhancement method of claim 9.

* * * * *